US012654610B2

(12) United States Patent
Walker et al.

(10) Patent No.: US 12,654,610 B2
(45) Date of Patent: Jun. 16, 2026

(54) TRAILERS FOR TRANSPORTING COMMODITIES

(71) Applicant: CEI Equipment Company LLC, Cedar Rapids, IA (US)

(72) Inventors: Justin Walker, Cedar Rapids, IA (US); Mike Damisch, Cedar Rapids, IA (US)

(73) Assignee: CEI Equipment Company LLC, Cedar Rapids, IA (US)

( * ) Notice: Subject to any disclaimer, the term of this patent is extended or adjusted under 35 U.S.C. 154(b) by 3 days.

(21) Appl. No.: 18/674,554

(22) Filed: May 24, 2024

(65) Prior Publication Data

US 2025/0214500 A1 Jul. 3, 2025

Related U.S. Application Data

(60) Provisional application No. 63/616,081, filed on Dec. 29, 2023.

(51) Int. Cl.
B60P 3/22 (2006.01)

(52) U.S. Cl.
CPC ........... B60P 3/2245 (2013.01); B60P 3/2215 (2013.01); B60P 3/226 (2013.01)

(58) Field of Classification Search
CPC ..... B60P 1/40–42; B60P 3/2245; B60P 3/226; B60P 1/56

(Continued)

(56) References Cited

U.S. PATENT DOCUMENTS

| | | | |
|---|---|---|---|
| 610,440 | A | 9/1898 | Fredrickson |
| 1,866,005 | A | 7/1932 | Beaty |

(Continued)

FOREIGN PATENT DOCUMENTS

| | | |
|---|---|---|
| CA | 2165698 A1 | 8/1996 |
| CA | 2242473 A1 | 1/2000 |

(Continued)

OTHER PUBLICATIONS

Ledwell "Add Time Back In To Your Day—Efficiency In Feed Transportation" accessed from https://ledwell.com/add-time-back-to-your-day-efficiency-in-feed-transportation/ on May 6, 2024.

(Continued)

*Primary Examiner* — Joseph A Dillon, Jr.
(74) *Attorney, Agent, or Firm* — Andrus Intellectual Property Law, LLP

(57) ABSTRACT

A trailer for transporting a commodity includes a tank defining a chamber that is configured to receive the commodity and a discharge hopper located vertically below the chamber and configured to receive the commodity from the chamber. The discharge hopper includes a trough wall that at least partially defines a channel and the trough wall has a middle wall section and a side wall section surface on each lateral side of the middle wall section. Each side wall section is vertically located above the middle wall section. A floor auger extends in the channel and configured to convey the commodity toward the rear end. A hanger suspends the floor auger relative to the channel, and the hanger having a first hanger arm that couples to one of the side wall sections and a second hanger arm that couples to the other of the side wall sections.

20 Claims, 23 Drawing Sheets

(58) Field of Classification Search
USPC ....................................... 414/526; 406/79–81
See application file for complete search history.

(56) References Cited

U.S. PATENT DOCUMENTS

| | | | | |
|---|---|---|---|---|
| 2,751,203 | A | | 6/1956 | Compton |
| 2,921,670 | A | | 1/1960 | Albers |
| 3,176,832 | A | | 4/1965 | Wilkes |
| 3,179,272 | A | * | 4/1965 | Goldberger ............... B60P 1/40 |
| | | | | 298/36 |
| 3,241,657 | A | | 3/1966 | Buschbom |
| 3,252,562 | A | | 5/1966 | Brembeck |
| 3,327,840 | A | | 6/1967 | Wilkes |
| 3,717,272 | A | * | 2/1973 | Chartier .................... B60P 1/40 |
| | | | | 198/313 |
| 4,070,059 | A | | 1/1978 | Ksenych |
| 4,234,109 | A | * | 11/1980 | Goodhart ............. A01C 15/006 |
| | | | | 239/289 |
| 4,669,945 | A | * | 6/1987 | Pollard .................. B65G 33/32 |
| | | | | D34/28 |
| 5,505,583 | A | | 4/1996 | Gaddis |
| 5,556,237 | A | * | 9/1996 | Rexius ...................... B60P 1/60 |
| | | | | 406/48 |
| 5,690,466 | A | | 11/1997 | Gaddis |
| 5,797,480 | A | | 8/1998 | Gaddis |
| 5,875,882 | A | | 3/1999 | Pollock |
| 6,113,339 | A | | 9/2000 | Adams |
| 6,422,803 | B1 | * | 7/2002 | Adams ...................... B60P 1/40 |
| | | | | 414/520 |
| 6,808,354 | B1 | | 10/2004 | Kulbeth |
| 6,964,551 | B1 | * | 11/2005 | Friesen ..................... B60P 1/56 |
| | | | | 410/80 |
| 6,976,819 | B2 | | 12/2005 | Kulbeth |
| 7,367,881 | B2 | * | 5/2008 | Voss ................... A01D 41/1217 |
| | | | | 414/526 |
| 7,381,131 | B1 | * | 6/2008 | Harpole .................. A01F 12/46 |
| | | | | 198/671 |
| 7,470,180 | B2 | | 12/2008 | Honey |
| 7,891,902 | B2 | | 2/2011 | Pettey |
| 8,075,062 | B2 | * | 12/2011 | Hicks ........................ B60P 1/56 |
| | | | | 298/33 |
| 9,090,198 | B2 | * | 7/2015 | Engle ........................ B60P 1/42 |
| 9,211,830 | B1 | * | 12/2015 | Hensley .................... B60P 1/40 |
| 9,643,787 | B1 | | 5/2017 | Carteri |
| 9,840,381 | B1 | | 12/2017 | Carteri |
| 10,434,923 | B2 | * | 10/2019 | Baker ........................ B60P 1/36 |
| 10,448,575 | B1 | * | 10/2019 | Gerdeman ................ B60P 1/40 |
| 10,518,980 | B2 | * | 12/2019 | Gerdeman ............. B65G 33/32 |
| 10,701,860 | B2 | * | 7/2020 | Loutz ................. A01D 41/1217 |
| 10,836,296 | B2 | * | 11/2020 | Hall .......................... B60P 1/40 |
| 10,874,055 | B2 | * | 12/2020 | Gerdeman ................ B60P 1/40 |
| 11,008,177 | B2 | * | 5/2021 | Banthia ..................... B60P 1/40 |
| 11,140,829 | B2 | * | 10/2021 | Van Mill ................. A01F 12/46 |
| 11,351,905 | B2 | | 6/2022 | Walker |
| 11,825,771 | B2 | | 11/2023 | Thomas |
| 11,963,482 | B2 | * | 4/2024 | Schlimgen ........... B65G 41/002 |
| 2001/0026755 | A1 | * | 10/2001 | Wood ........................ B60P 1/42 |
| | | | | 414/523 |
| 2003/0175102 | A1 | * | 9/2003 | Cresswell ................. B60P 1/42 |
| | | | | 414/526 |
| 2004/0184905 | A1 | * | 9/2004 | Kinzenbaw ............... B60P 1/40 |
| | | | | 414/526 |
| 2006/0045701 | A1 | * | 3/2006 | Dillon ............... A01D 41/1208 |
| | | | | 414/526 |
| 2007/0172338 | A1 | * | 7/2007 | Reimer ............... A01D 43/073 |
| | | | | 414/339 |
| 2007/0191080 | A1 | * | 8/2007 | Voss ................... A01D 41/1217 |
| | | | | 460/114 |
| 2013/0004274 | A1 | * | 1/2013 | Engle ........................ B60P 1/42 |
| | | | | 414/520 |
| 2015/0239384 | A1 | * | 8/2015 | Meier ....................... B60P 1/60 |
| | | | | 414/489 |
| 2015/0258926 | A1 | * | 9/2015 | Wick .................... E01C 19/182 |
| | | | | 414/326 |
| 2017/0182921 | A1 | * | 6/2017 | Van Mill ................... B60P 1/42 |
| 2017/0355538 | A1 | | 12/2017 | Carteri |
| 2023/0331136 | A1 | * | 10/2023 | Miller ..................... B07B 1/005 |

FOREIGN PATENT DOCUMENTS

| | | | |
|---|---|---|---|
| CN | 204099445 | U | 1/2015 |
| CN | 105544441 | A | 5/2016 |
| CN | 207999454 | U | 10/2018 |
| DE | 102005030695 | A1 | 1/2007 |
| JP | 60015234 | A * | 1/1985 |

OTHER PUBLICATIONS

Ledwell "Classic Bulk Hall Feed Trailer" accessed from https://ledwell.com/product/classic-bulk-haul-trailer/ on May 6, 2024.
Ledwell "Drop Deck Feed Trailer" accessed from https://ledwell.com/product/drop-deck-feed-trailer/ on May 6, 2024.

* cited by examiner

1

TRAILERS FOR TRANSPORTING COMMODITIES

CROSS-REFERENCE TO RELATED APPLICATION

The present disclosure is based on and claims priority to U.S. Provisional Patent Application No. 63/616,081 filed Dec. 29, 2023, the disclosure of which is incorporated herein by reference.

FIELD

The present disclosure relates to trailers, and specifically to trailers for transporting commodities such as animal feed.

BACKGROUND

The following U.S. patent is incorporated herein by reference in entirety.

U.S. Pat. No. 11,351,905 discloses a gate assembly having a track comprising a vertical portion and two angular portions on opposing sides of the hopper. A pair of rectangular gates each having a longitudinal edge and opposing lateral edges slidingly engaged on the track allows the gates to move between a lowered, closed position and a raised, open position. A hinge combines the longitudinal edge of each of the pair of rectangular gates and allows them to pivot toward and away from each other during closing and opening, respectively.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain independent examples, a trailer is for transporting a commodity and longitudinally extends between a front end and a rear end. The trailer includes a tank defining a chamber that is configured to receive the commodity and a discharge hopper located vertically below the chamber. The discharge hopper is configured to receive the commodity from the chamber, and the discharge hopper includes a trough wall that at least partially defines a channel. The trough wall has a middle wall section and a side wall section on each lateral side of the middle wall section. Each side wall section is located vertically above the middle wall section. A floor auger extends in the channel and configured to convey the commodity in a direction from the front end to rear end, and a hanger suspends the floor auger in the channel. The hanger has a first hanger arm that couples to one of the side wall sections and a second hanger arm that couples to the other of the side wall sections.

Optionally the hanger includes a body located between the first hanger arm and the second hanger arm. The body laterally extends along a body axis and the first hanger arm extends along an arm axis that extends transverse to the body axis. Optionally an arm angle is defined between the arm axis and the body axis, and the arm angle is an obtuse angle. Optionally the arm angle is a first arm angle and the second hanger arm extends along another arm axis that extends transverse to the body axis. A second arm angle is defined between the arm axis and the body axis, the second arm angle being an obtuse angle. Optionally the first arm angle equals the second arm angle. Optionally a bearing is for rotatably coupling the floor auger relative to the channel and the bearing is coupled to the body and located vertically below the body. Optionally a removable spacer is located between the body and the bearing to thereby change vertical position of the floor auger relative to the trough. Optionally the hanger is one of a plurality of hangers that suspend the floor auger relative to the channel, and the plurality of hangers are longitudinally spaced apart along the floor auger. Optionally the trough has a vertically sloped second trough section located between two longitudinally extending first trough sections. Optionally the floor auger includes a first auger section that extends along one of the first trough sections, a second auger section that extends along the second trough section, a third auger section that extends along the other of the first trough sections, and a pair of connection assemblies utilized to couple the second auger section to the first auger section and the second auger section to the third auger section, each of the connection assemblies includes a universal joint. Optionally a pot is configured to receive the commodity from the channel, a riser auger is configured to convey the commodity from the pot, a boom arm is configured to receive the commodity from the riser auger, the boom arm having a plurality of boom sections, and a boom auger is in the boom arm and configured to convey the commodity along the boom arm to a discharge hood from which the commodity is dispensed. The boom auger includes a plurality of boom auger section. A boom connection assembly is located between adjacent boom sections in the plurality of boom section and adjacent boom auger sections in the boom auger sections. The boom connection assembly couples the adjacent boom sections and the boom auger sections together. Optionally the boom connection assembly includes a center ring that encircles the boom auger and to which the adjacent boom sections are coupled. Optionally each boom section includes a coupler ring coupled to the center ring. Optionally the boom connection assembly includes a boom hanger that suspends the adjacent boom auger sections in the boom arm. Optionally the boom hanger includes a body between a pair of arms that radially extend and couple to the center ring and the adjacent boom auger sections are coupled to the body. Optionally the boom hanger includes a body between a pair of arms that radially extend and couple to the center ring and the adjacent boom auger sections are coupled to the body. Optionally a door is for closing an opening into the chamber of the tank, a first door arm is coupled between the door and the tank, a second door arm is coupled between the door and the tank, the second door arm is spaced apart from the first door arm, and a rod is coupled to and extending between the first door arm and the second door arm. An actuator rotates the rod in a first direction to thereby move the first door arm and the second door arm together in a first direction such that door uncovers the opening and a second direction to thereby move the first door arm and the second door arm together in a second direction such that door covers the opening. Optionally a gear is coupled to the rod that meshes with a bracket having a plurality of teeth and the gear and the bracket are located adjacent to the second door arm. Optionally a pot configured is to receive the commodity from the channel, a riser auger is configured to convey the commodity from the pot, a boom arm is configured to receive the commodity from the riser auger, the boom arm having a plurality of boom sections, and a boom auger is in the boom arm and configured to convey the commodity along the boom arm to a discharge hood from which the commodity is dispensed. The boom auger includes a plurality of boom auger sections. A boom connection assembly is located between adjacent boom sections in the plurality of boom section and adjacent boom auger sections in the boom auger sections. The boom connection assembly couples the adjacent boom sections and the boom auger sections together. Optionally a center ring encircles the boom auger and to which the adjacent boom sections are couple and a boom hanger suspends the adjacent boom auger sections in the boom arm.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

Before any examples of the present disclosure are explained in detail, it is to be understood that the examples of the present disclosure are not limited in its application to the details of construction and the arrangement of components set forth in the following description or illustrated in the following drawings. The examples of the present disclosure are capable of other examples and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "bottom," "front," "rear", "back," "left," "right," "lateral" or "longitudinal" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements from another.

Figure 1:
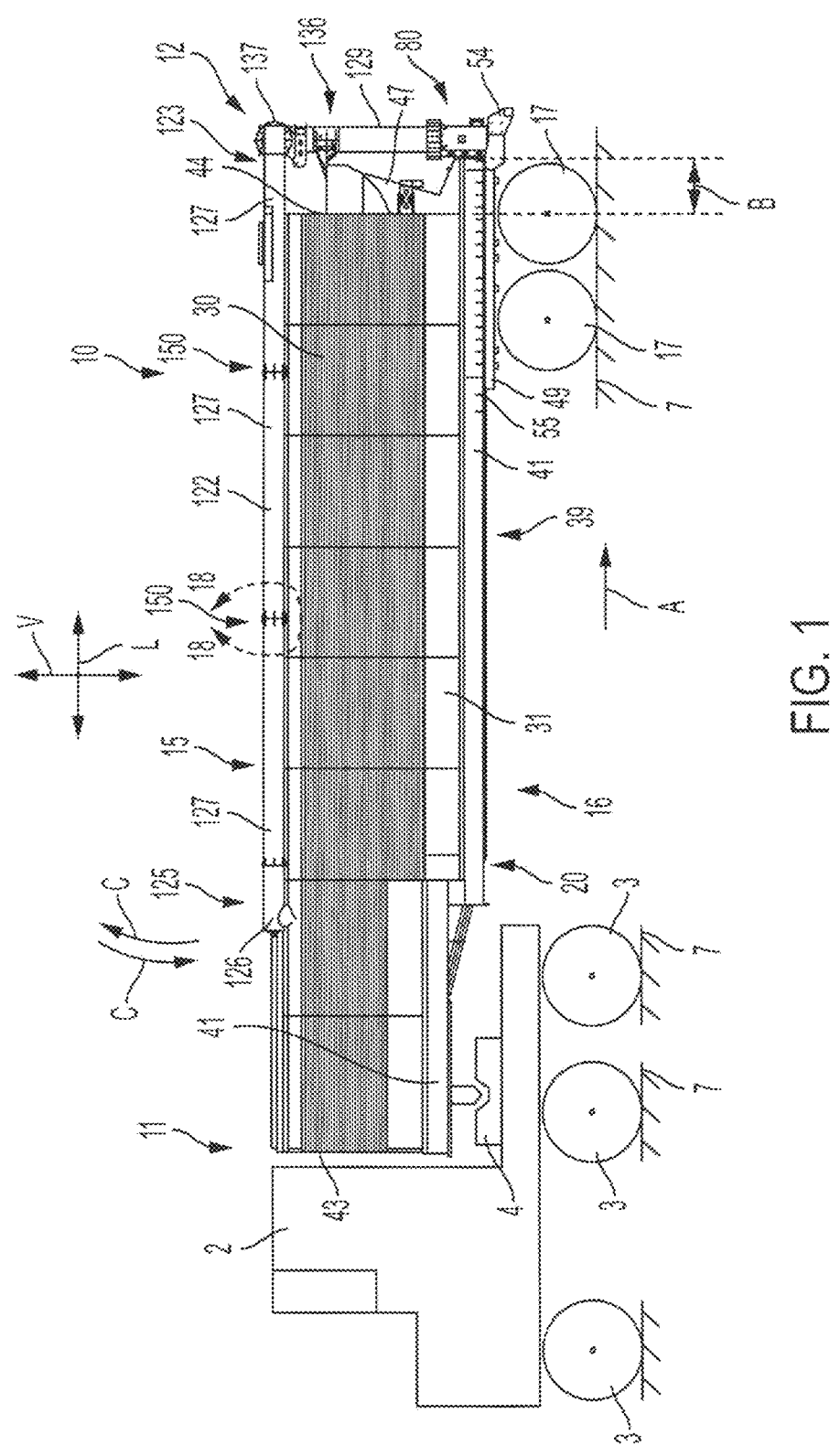
FIG. 1 is a side view of an example trailer according to the present disclosure.

FIG. 1 depicts an example towing vehicle 2 (e.g., semi-trailer truck) coupled to an example trailer 10 of the present disclosure. The towing vehicle 2 has a plurality of wheels 3 that engage the ground 7 and a fifth wheel 4 that selectively couples to a coupling component (e.g., kingpin 18) extending from the trailer 10. The towing vehicle 2 is configured to tow the trailer 10 to different locations.

The trailer 10 extends longitudinally between a first or front end 11 and a second or rear end 12 (see example longitudinal axis L) and extends transversely between a first side 13 and an opposite second side 14 (see example lateral axis T). The trailer 10 also extends vertically between a trailer top 15 and a trailer bottom 16 (see example vertical axis V). Wheels 17 engage the ground 7. Note that while the trailer 10 depicted in FIG. 1 has a specific construction, the trailer 10 according to the present disclosure can vary and be any suitable type of trailer such as a low-center-of-gravity bulk feed trailer, straight body bulk feed trailer, straight feed body, and/or the like.

Figure 2:
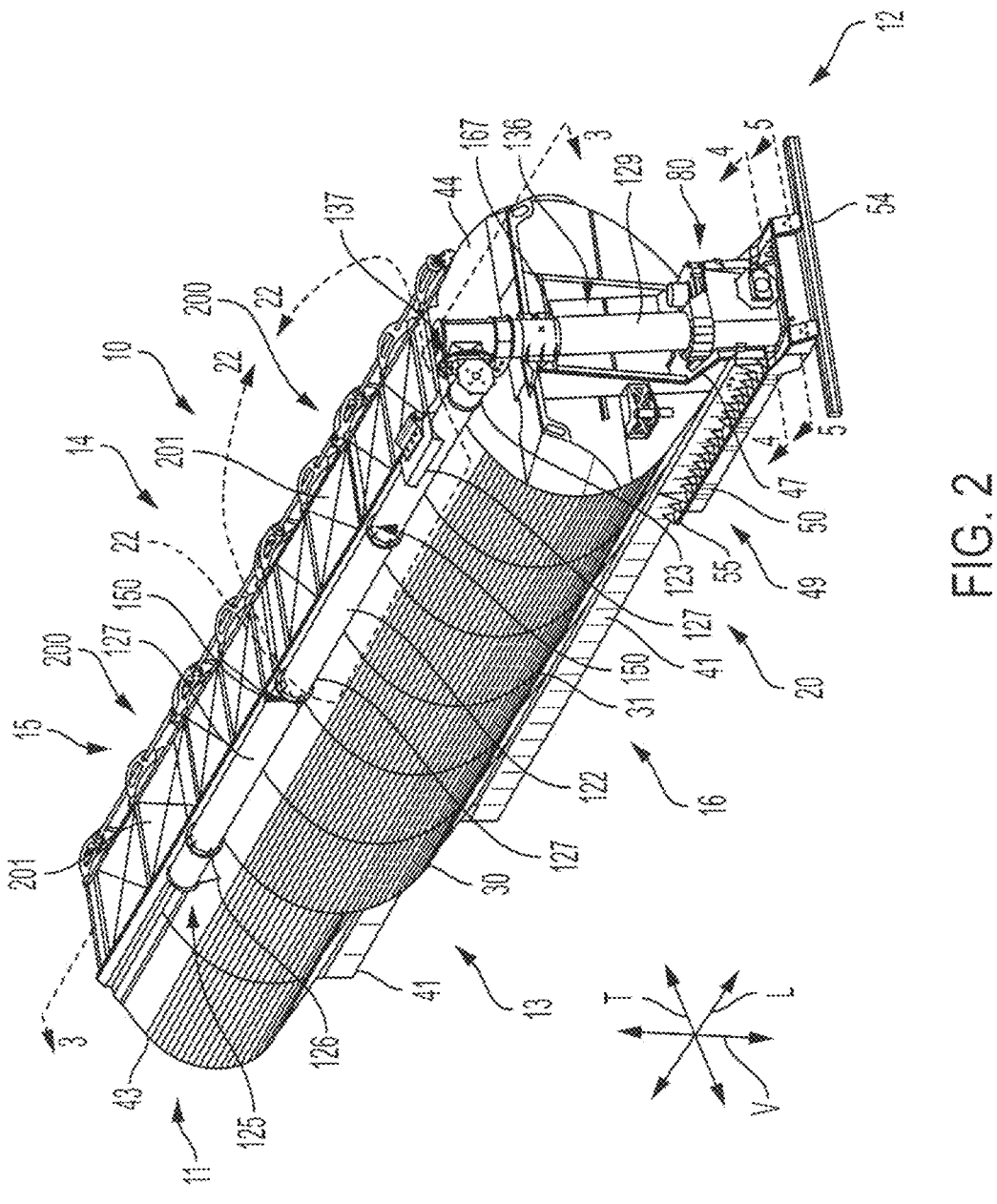
FIG. 2 is a perspective view of the example trailer of FIG. 1.
Figure 3:
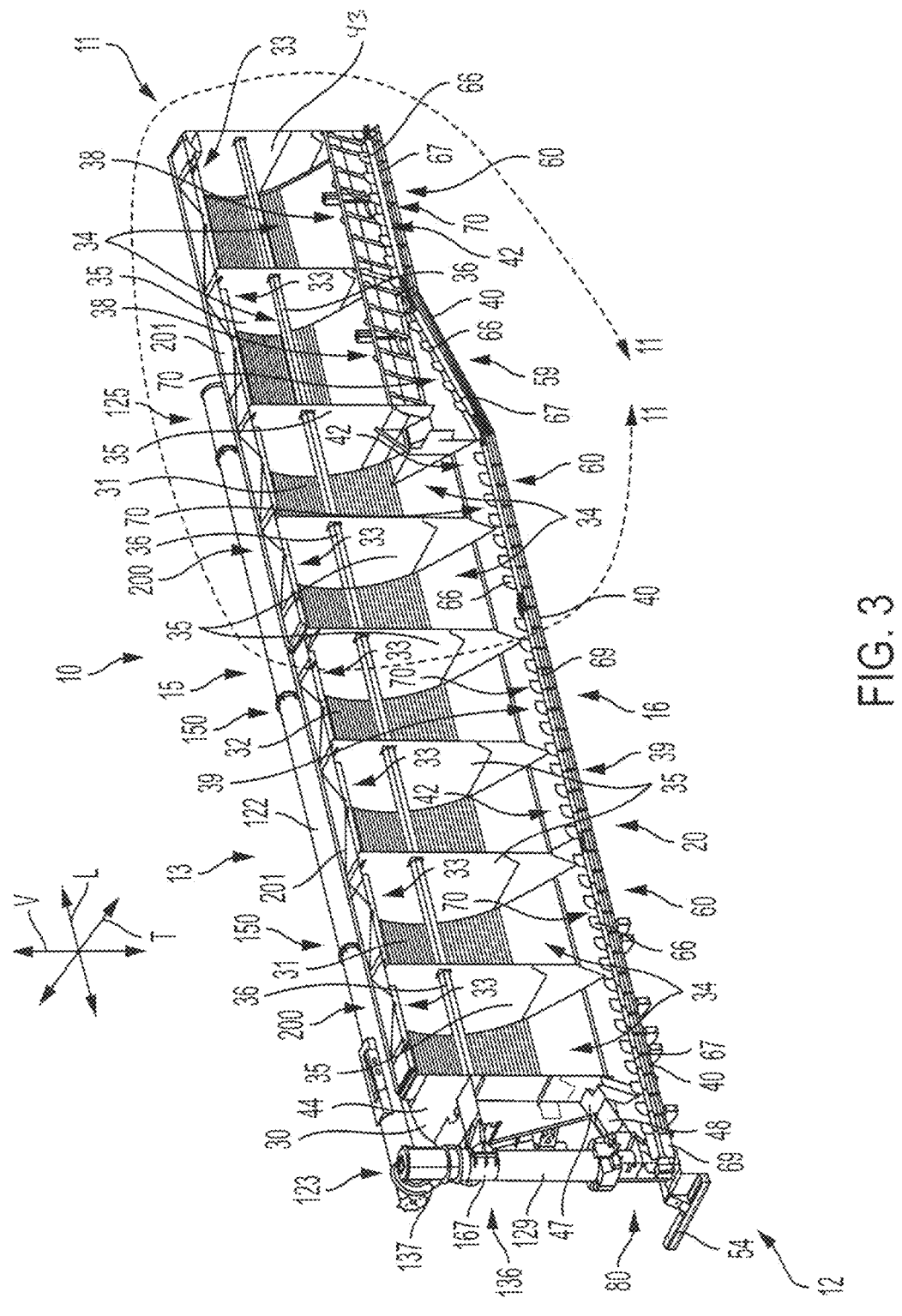
FIG. 3 is a cross-sectional view of the example trailer of FIG. 1 along line 3-3 on FIG. 2.
Figure 4:
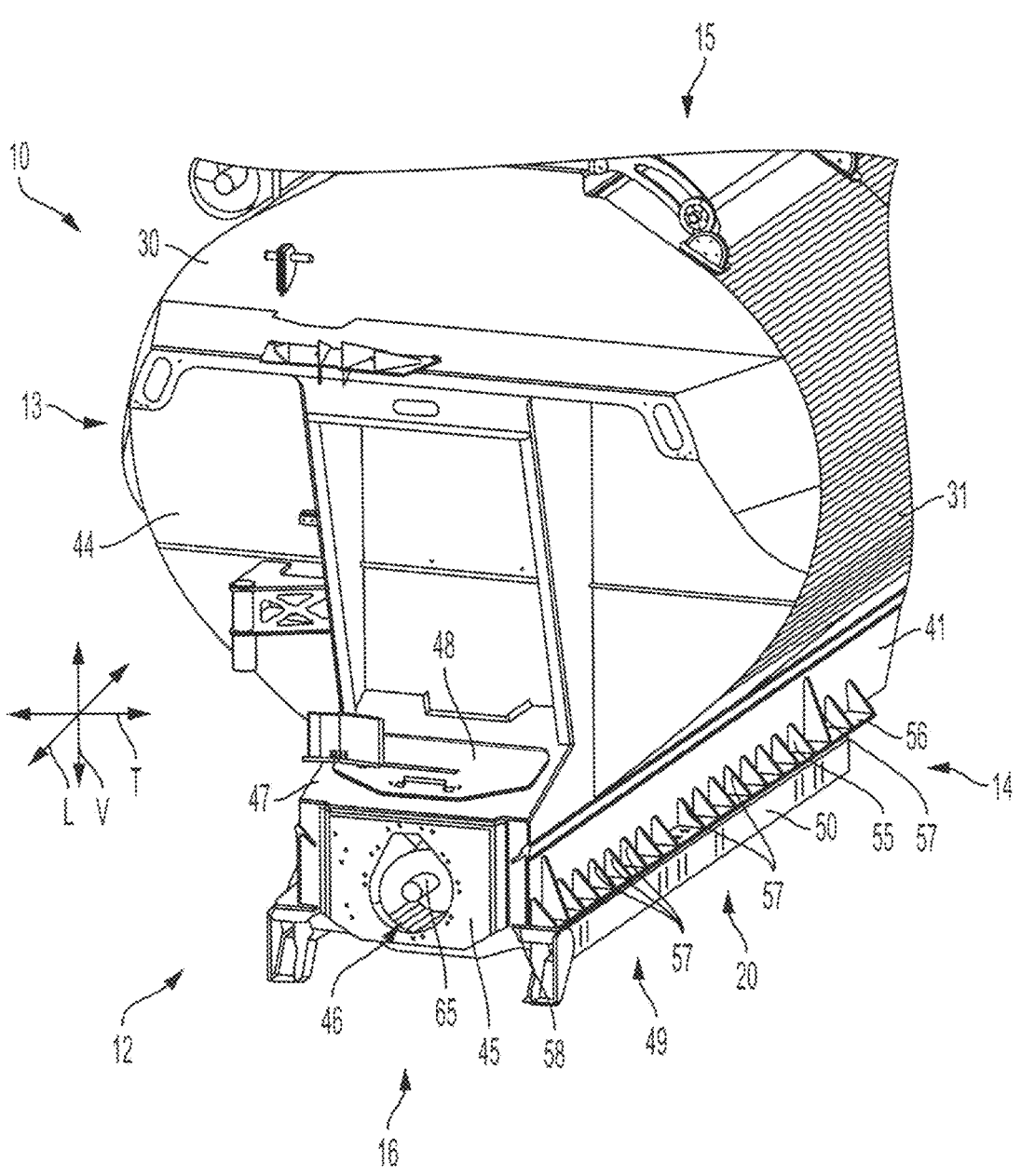
FIG. 4 is a cross-sectional view of the example tailer of FIG. 1 along line 4-4 on FIG. 2.
Figure 5:
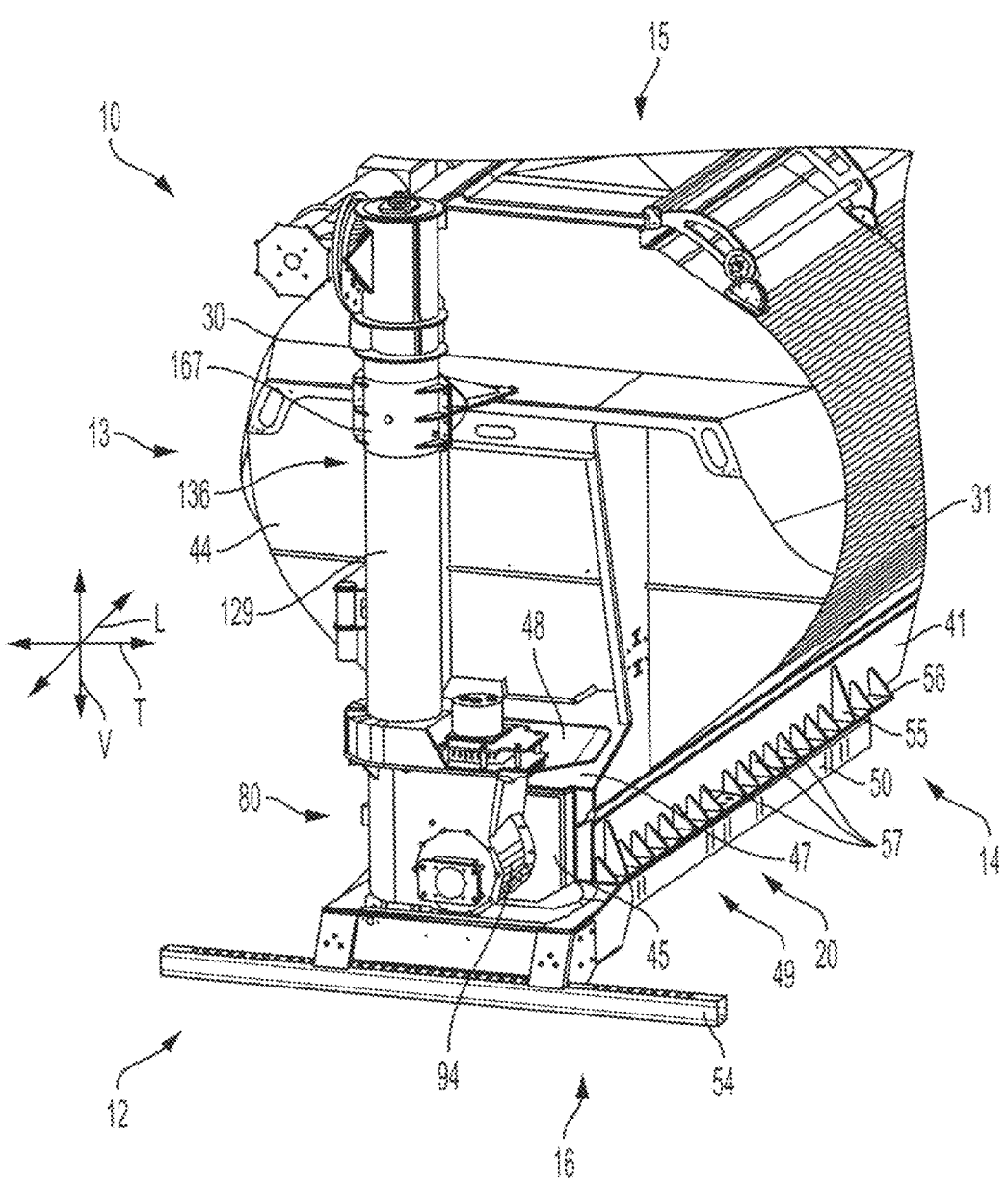
FIG. 5 is a perspective end view of the example trailer of FIG. 1.

FIGS. 2-3 depict the trailer 10 in greater detail. The trailer 10 has a frame 20 that extends along the trailer bottom 16. The frame 20 can include any number of components, such as sills 41, a subframe 49, and/or a rear bumper guard 54, some of which are described herein below. Optionally, collapsible and/or foldable legs (not depicted) are coupled to the frame 20 and are configured to support the trailer 10 on the ground 7 when the trailer 10 is not coupled to the towing vehicle 2 (FIG. 1).

The frame 20 supports a tank 30 thereon, and the tank 30 is configured to hold a commodity, such as animal feed or grain. The tank 30 has a first or front end wall 43 that defines the front end of the tank 30 and a second or rear end wall 44 that defines the rear end of the tank 30. The tank 30 has a sidewall 31, and the sidewall 31 and the end walls 43, 44 define a chamber 32 in the tank 30. One or more fill openings 33 at the trailer top 15 permit the commodity is received into the chamber 32. One or more door assemblies 200 (described herein) selectively open and close the fill opening(s) 33.

The tank 30 also includes one or more inner divider walls 35 extending through the chamber 32 and being coupled to the inner surface of the sidewall 31. The divider walls 35 divide the chamber 32 into a plurality of sub-chambers 34 and structurally support the sidewall 31. In certain examples, the divider walls 35 prevent commodities in the adjacent sub-chambers 34 from commingling with each other. Stiffeners bars 36 extend between adjacent divider walls 35 and are configured to prevent the divider walls 35 from buckling when the sub-chambers 34 are filled with commodities and/or to increase the rigidity of the tank 30.

One or more discharge gate assemblies 38 in the tank 30 separate the chamber 32 from a discharge hopper 39 that extends longitudinally below the tank 30. Note that only two discharge gate assemblies 38 are depicted in FIG. 3 for clarity. Each discharge gate assembly 38 is manually or electronically operable to close such that the commodity is retained in the sub-chamber 34 and open such that the commodity can flow under force of gravity through into the discharge hopper 39. Reference is made to above-incorporated U.S. Pat. No. 11,351,905 for examples and/or features of conventional gate assemblies which may be incorporated into the trailer 10 of the present disclosure. In certain examples, discharge gate assemblies 38 may be excluded from portions of the tank 30 such that one or more sub-chambers 34 and the discharge hopper 39 are always in communication with each other.

The discharge hopper 39 includes a trough 40 that extends between opposing sills 41 of the frame 20. The trough 40 and/or the sills 41 define a longitudinally extending channel 42. In certain examples, the trough 40 vertically overlaps at least a portion of the sills 41.

A floor auger 65 is positioned in the channel 42 and is configured to convey the commodity toward the rear end 12 of the trailer 10 (see direction arrow A on FIG. 1). The floor auger 65 extends into a pot 80 (further described herein) configured to direct the commodity to a boom arm 122 that dispenses the commodity into a storage container (not depicted; e.g. a feed hopper).

Several components and/or features noted above are described in greater detail herein below.

The present inventors recognized that conventional trailers often have sills that extend only to the rearmost portion of the tank and include complex conventional pot structures which are attached to the end of the sills. The conventional pot structures facilitate mounting of conventional riser assemblies and boom arms to the trailer. The present inventors also recognized that conventional pots are complex, heavy, costly, and prone to stress failures. Conventional pots may also extend past the rear bumper guard of the conventional trailer thereby increasing the risk that the conventional pot and/or rear end of the trailer are inadvertently damaged.

As such, through research and experimentation, the present inventors developed the example trailers 10 according to the present disclosure which include sills 41 and/or pots 80 which are novel and provide advantages over the components of conventional trailers.

FIGS. 1 and 4-6 depict the sills 41 and the rear end 12 of the trailer 10 in greater detail. The sills 41 extend in a rearward direction from the rear end wall 44 of the tank 30. That is, the sills 41 extend along the longitudinal length of the tank 30 and longitudinally away from the rear end wall 44 of (see first distance B on FIG. 1 depicting the extension of the sills 41 rearwardly from the rear end wall 44). The sills 41 are a structural member of the frame 20, and extending the sills 41 rearwardly from the rear end wall 44 provides a structural platform on which other components of the trailer 10 such as the pot 80, the riser assembly 136, and/or the boom arm 122 can be supported. Note that when the sills 41 are extended longitudinally rearwardly from the rear end wall 44 the trough 40, the channel 42, and/or the floor auger 65 also extend rearwardly of the rear end wall 44.

A mounting plate 45 (FIG. 4) is coupled to the sills 41 and the trough 40, and the mounting plate 45 defines the rear end of the discharge hopper 39. As such, the mounting plate 45 is longitudinally spaced apart from the rear end wall 44. The mounting plate 45 defines an opening 46 through which the floor auger 65 extends into the pot 80. The mounting plate 45 provides a mounting surface to which the pot 80 is coupled via any suitable fasteners (e.g., bolts, screws, welds).

A hopper cover 47 is positioned over the discharge hopper 39 and is configured to prevent debris and/or moisture from entering the channel 42. The hopper cover 47 extends from the rear end wall 44 to the mounting plate 45. The hopper cover 47 optionally includes a hopper door 48 that is operable such that the operator can inspect the floor auger 65 and/or verify that the commodity is being conveyed by the floor auger 65 to the pot 80. In certain examples, the hopper cover 47 also covers pneumatic, hydraulic, and/or electrical systems and/or components of the trailer 10.

A subframe 49 is coupled to the sills 41 and is also coupled to other components of the trailer 10 including rear wheel axles, the wheels, and/or braking systems. The subframe 49 is also configured to vertically support the tank 30. The subframe 49 includes a pair of longitudinally extending rails 50 and a plurality of laterally extending beams 51. The beams 51 laterally extend between the rails 50. A rear bumper guard 54 is coupled to the subframe 49 and is configured to protect the trailer 10 from contact with other vehicles and/or structures. The subframe 49 advantageously permits the sills 41, the rear bumper guard 54, and/or wheel fenders (not depicted) to be easily coupled and/or decoupled to each other. Time-consuming and/or costly maintenance to the component at the rear end 12 of the trailer 10 is reduced or eliminated as the components are easily coupled and/or decoupled from each other (e.g., remove damaged wheel fenders). In contrast, conventional trailers are not conducive to efficient maintenance or repair of components at the rear end due to the construction of the rear end.

Figure 7:
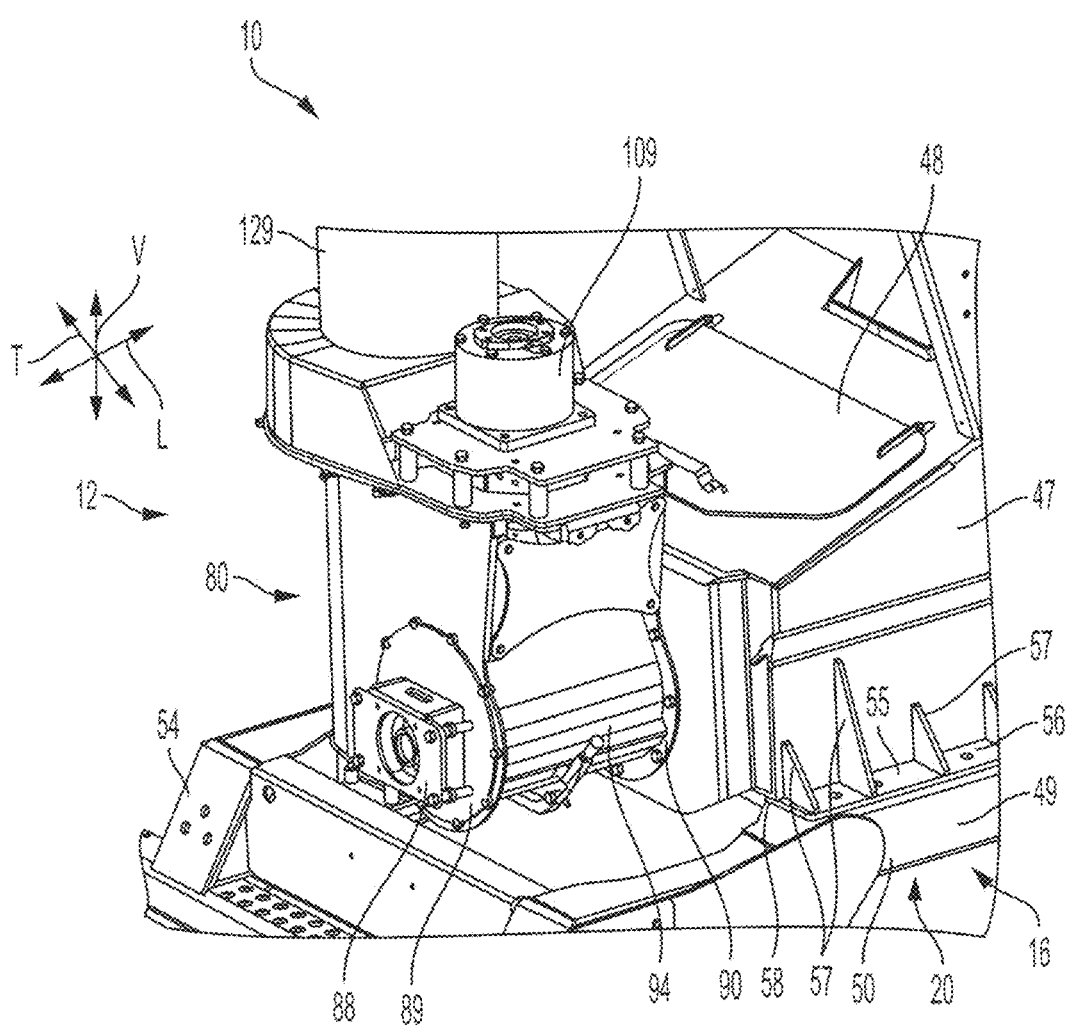
FIG. 7 is an enlarged perspective end view of the example tailer of FIG. 1.
Figure 8:
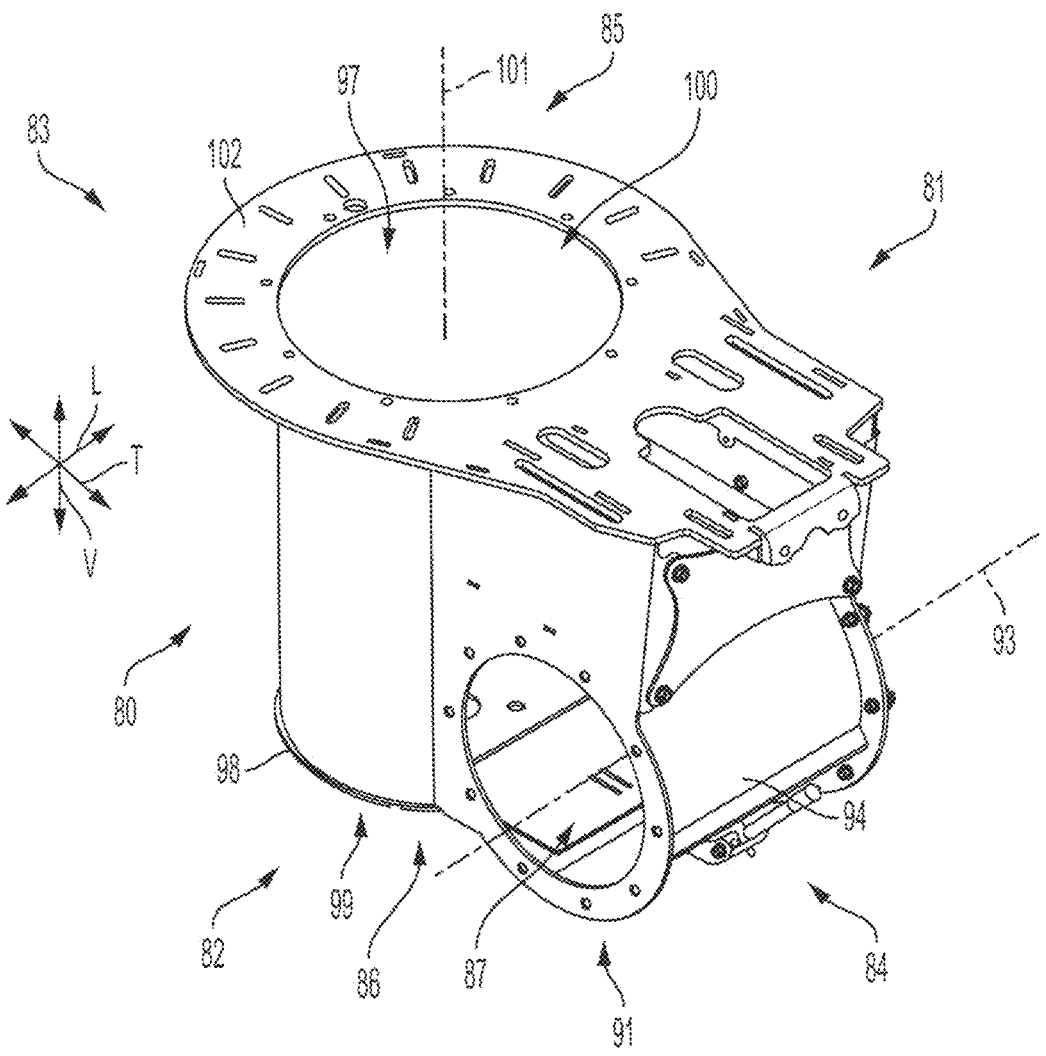
FIGS. 8-9 are example perspective views of an example pot according to the present disclosure.
Figure 9:
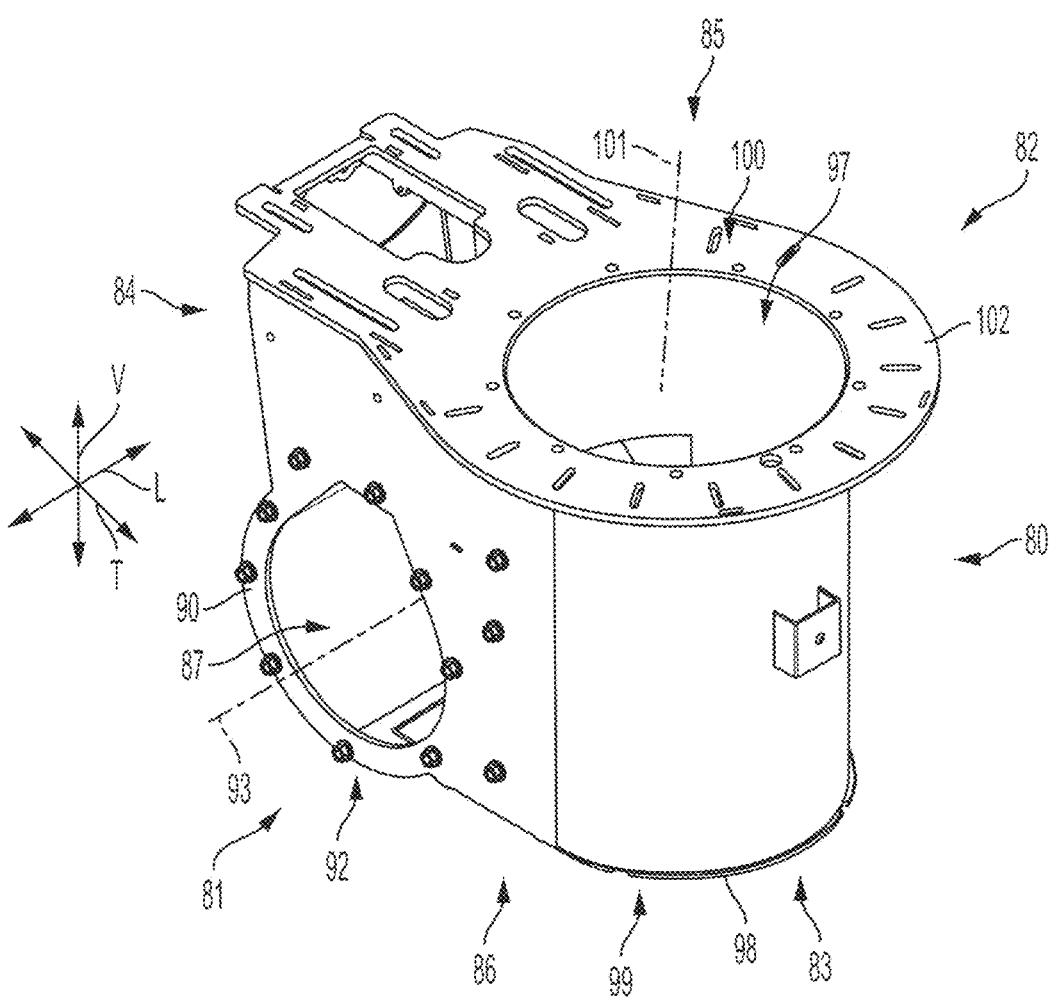

Novel joining beams 55 are provided and configured to facilitate assembly and coupling of the subframe 49 to the sills 41. The joining beams 55 extend along each sill 41, and the joining beam 55 has a plate that is coupled to the rail 50 via fasteners (e.g., bolts, screws, welds). The joining beam 55 also has a plurality of legs 57 that vertically extend from the plate 56 and are coupled to the sills 41 via fasteners (e.g., bolts, screws, welds). In one example assembly sequence of the trailer 10, the joining beams 55 are first coupled to the rails 50 of the subframe 49. The sills 41 are then located between the joining beams 55 and such legs 57 of the joining beams 55 can be welded to the sills 41. This example assembly sequence is more efficient than conventional assembly sequences for conventional trailers which often include time-consuming sequences requiring bolts and/or large number of welds. In certain examples, the joining beams 55 included lips 58 (see FIG. 7) on which the sills 41 are vertically supported.

Note that the joining beams 55 are coupled to the sills 41 and the subframe 49 at locations rearward of the rear end wall 44. These mounting positions are not possible with conventional trailers that have sills that terminate at the rear end wall of the tank. As such, the trailer 10 of the present disclosures has significant assembly, repair, and/or loading advantages over the conventional trailers due to the extension of the sills 41 past the rear end wall 44 and the results space defined above the sills 41. For example, other components of the trailer 10 (e.g., the pot is easily mounted to the sills without extensive framing components). In certain examples, the sills 41 extending rearward of the rear end wall 44 allows the rear wheels to be positioned a minimum distance from the front of the trailer 10 and/or the towing vehicle 2 required to satisfy bridge load limits and laws. Note that in other examples, the subframe 49 is joined to the sills 41 without the joining beams 55 and instead can be joined to the sills 41 with other fasteners such as welds, bolts, and the like.

Turning now to FIGS. 1 and 7-10, the pot 80 is depicted in greater detail. The pot 80 receives and directs the commodity from the floor auger 65 to the riser assembly 136 and the boom arm 122. The pot 80 generally extends longitudinally between a first end 81 and a second end 82 (see example longitudinal axis L) and extends transversely between a first side 83 and an opposite second side 84 (see example lateral axis T). The pot 80 also extends vertically between a top end 85 and a bottom end 86 (see example vertical axis V).

The pot 80 has first flange 90 that engages and/or abuts the mounting plate 45 (FIG. 4), and the pot 80 defines a longitudinal extending first bore 87 (see first axis 93 along which the first bore 87 extends) with an open end 92 that faces the opening 46 in the mounting plate 45. Accordingly, at least a portion of the floor auger 65 extends into the first bore 87.

A motor 88 is mounted to a cover plate 89 of the pot 80 and is configured to rotate the floor auger 65. The cover plate 89 also closes the first bore 87 at a closed end 91 (note that FIGS. 8-9 exclude the cover plate 89). The other end of the first bore 87 is an open end such that the floor auger 65 extends into the first bore 87. As the motor 88 rotates the floor auger 65, the floor auger 65 conveys the commodity into the first bore 87. The floor auger 65 also includes a plurality of fin 69 configured to convey the commodity in the first bore 87 through a passageway 96 (FIG. 9) and into a second bore 97 defined by the pot 80. In certain examples, the pot 80 has an access door 94 for accessing the first bore 87.

The second bore 97 extends transverse relative the first bore 87 and along a second axis 101. The second bore 97 has a closed end 99 opposite an open end 100 faces the boom arm 122. A second flange 102 is at the open end 100, and a cover plate 98 closes the closed end 99.

Figure 10:
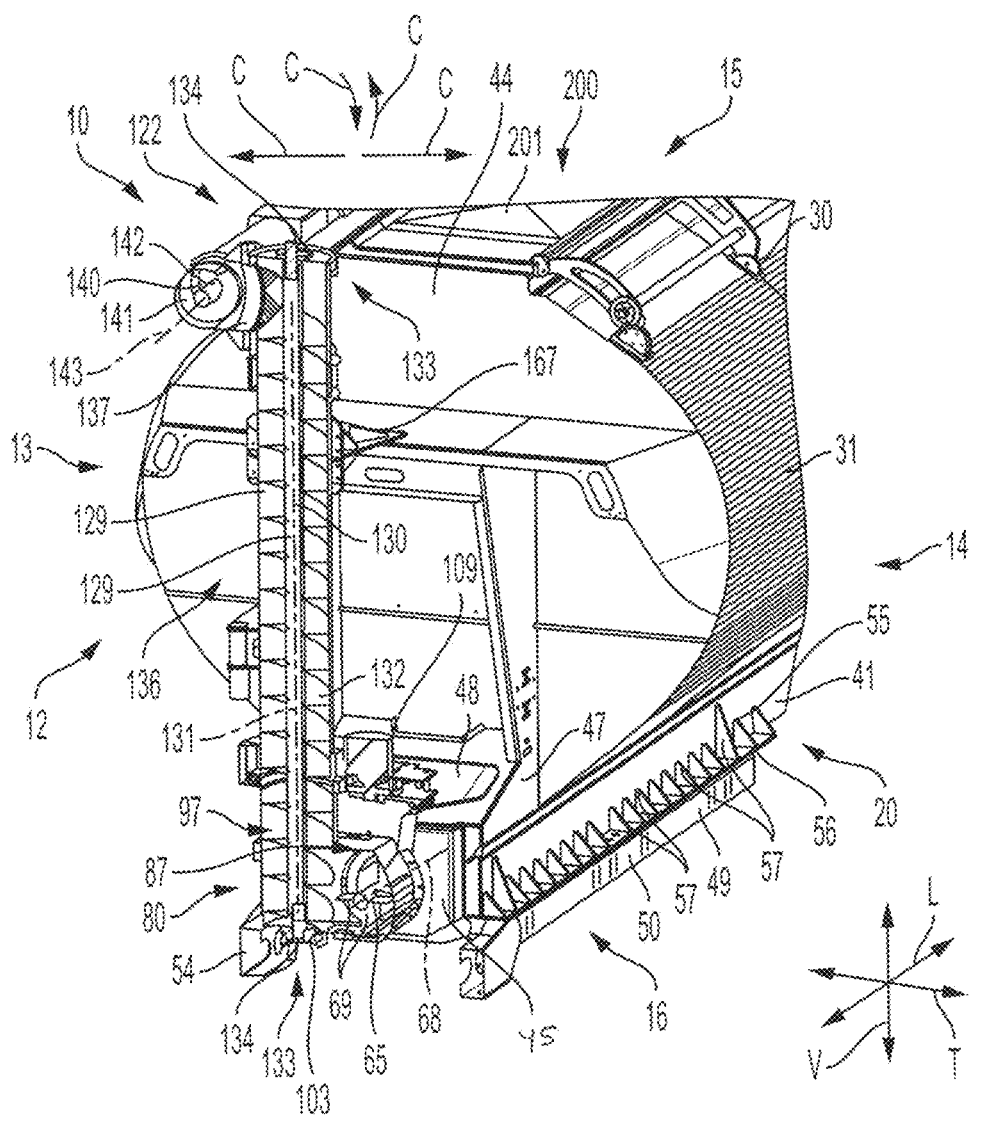
FIG. 10 is a cross-sectional view of the example tailer of FIG. 1 along line 5-5 on FIG. 2.

A riser auger 128 (see FIG. 10) is at least partially inserted into the second bore 97 and is configured to vertically convey the commodity received into the second bore 97 out of the second bore 97 and into a riser tube 129 (FIG. 10). The riser tube 129 is coupled to the second flange 102 of the pot 80. In certain examples, a bearing (not depicted) is positioned between the second flange 102 and the riser tube 129.

Figure 6:
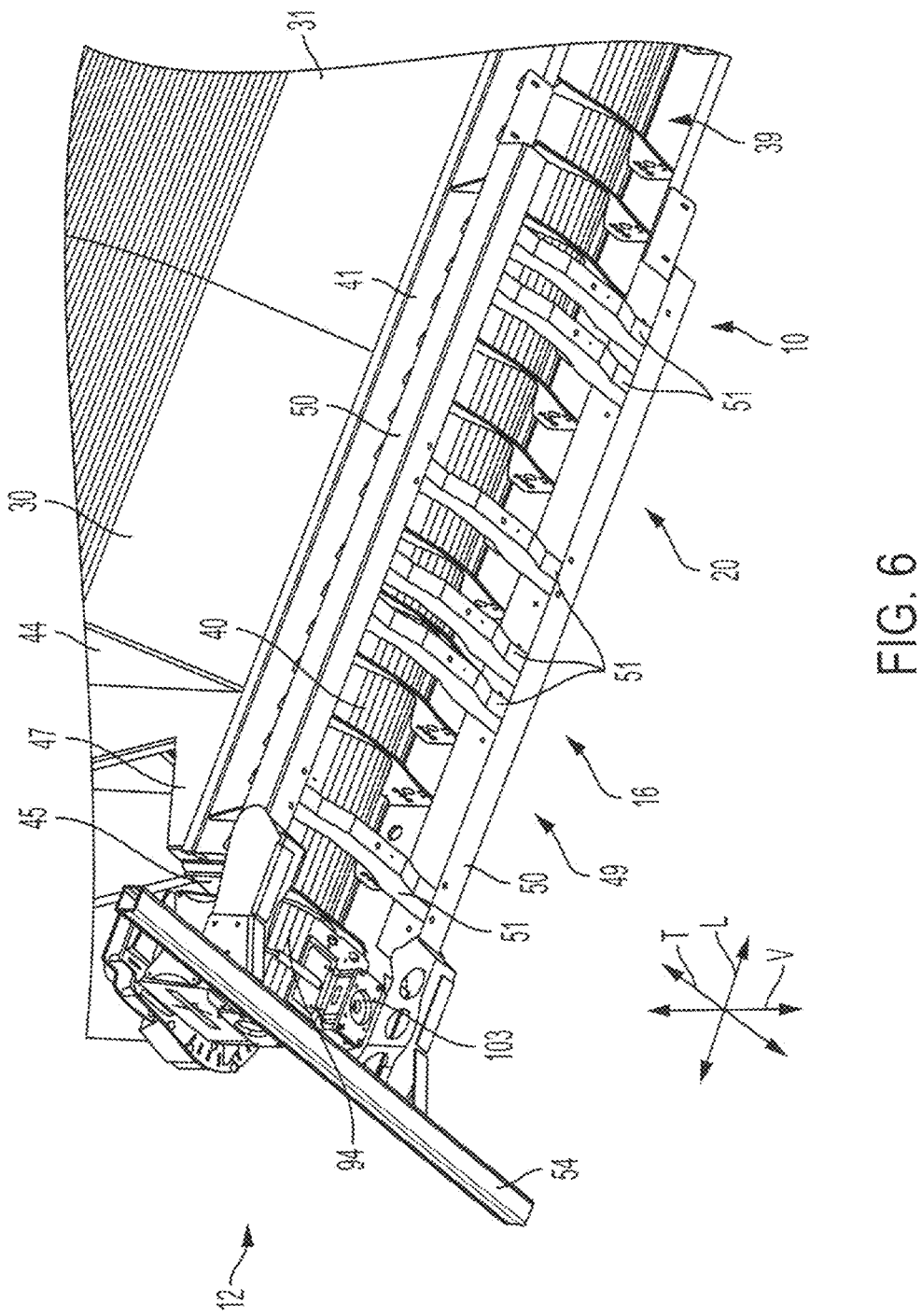
FIG. 6 is another perspective end view of the example trailer of FIG. 1.

A motor 109 (FIG. 7) is configured to rotate the riser tube 129. Another motor 103 (e.g., the motor 103 mounted on the pot 80 as depicted in FIG. 6) rotates the riser auger 128 to thereby convey the commodity into and along the riser tube 129. The riser auger 128 includes a shaft 130 that extends along an axis 131 and one or more spiral blades 132 (FIG. 10) that radially extend from the shaft 130. The spiral blades 132 convey the commodity through the riser tube 129 toward the boom arm 122 (FIG. 1) described further herein.

Turning now to FIGS. 11-17, the floor auger 65 is depicted in greater detail. The floor auger 65 can include one or more auger sections 70 which are coupled together. Each auger section includes a shaft 67 that extends along an axis 68 and one or more spiral blades 66 that radially extend from a shaft 67. Several connection assemblies 105-107, described herein below, are utilized to couple the auger sections 70 together.

As noted above, the floor auger 65 is positioned in the trough 40 and more specifically in the channel 42. The channel 42 is at least partially defined by a trough wall 72. The trough wall 72 has a trough surface 73 that at least partially defines the channel 42. In certain examples, the trough surface is curved and has a generally 'U' shape. In these examples, the channel 42 generally has a semi-cylindrical shape.

The trough wall 72 include a middle wall section 74 that is located vertically below and between a pair of opposing side wall sections 75 (see FIG. 14). One of the side wall sections 75 is located on each lateral side of the middle wall section 74 and the side wall sections 75 extend vertically above and laterally outwardly from the middle wall section 74. As the floor auger 65 conveys the commodity through the channel 42, the commodity is vertically supported by the middle wall section 74 and the side wall sections 75 also vertically support and/or bias the commodity laterally inwardly toward the center of the channel 42 and toward the middle wall section 74. As will be described in greater detail hereinbelow, one or more hangers 115 supports the floor auger 65 in the channel 42.

Figure 12:
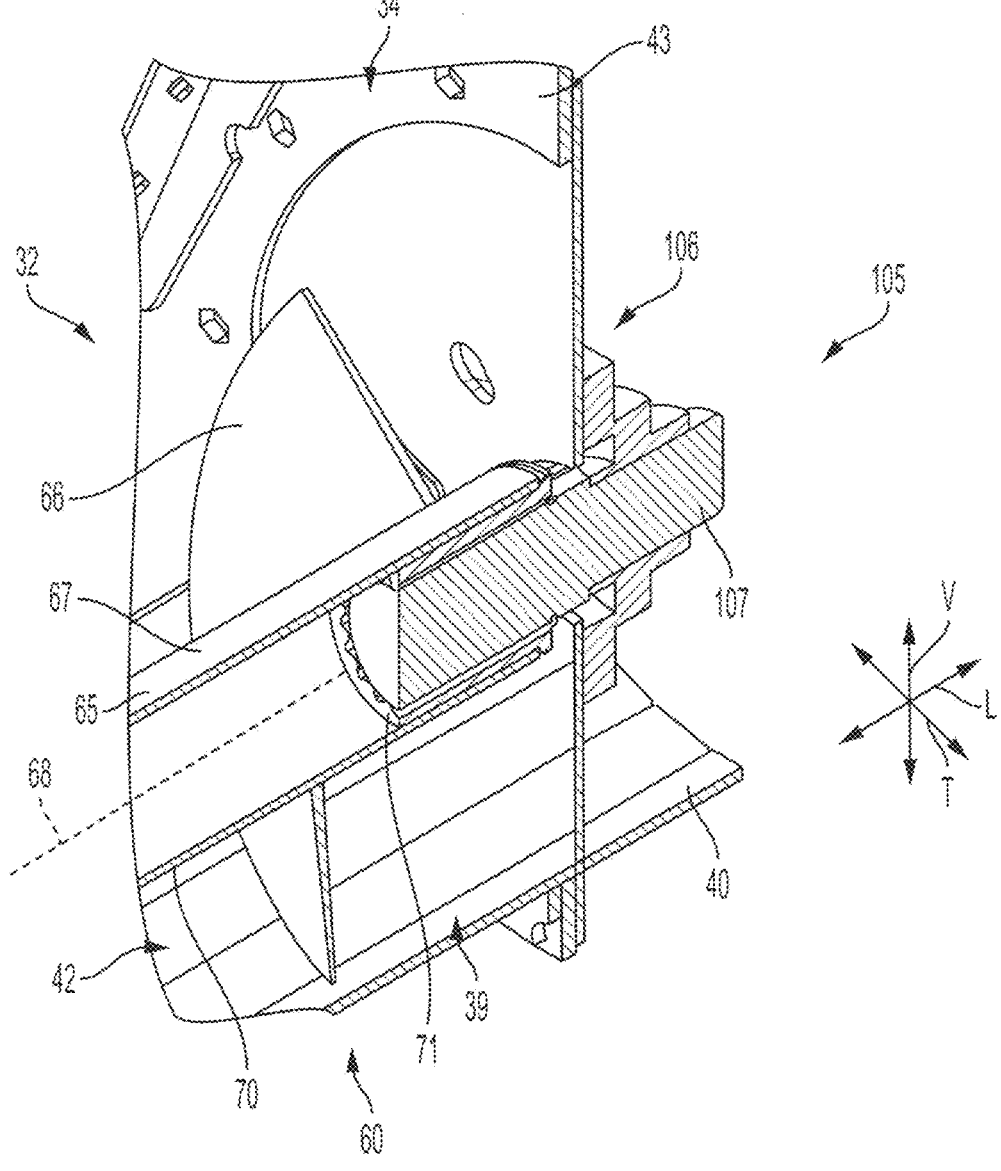
FIG. 12 is an enlarged cross-sectional view of the example trailer of FIG. 1 within line 12-12 on FIG. 11.

FIG. 12 depicts an example first connection assembly 105 that is utilized to couple an auger section 70 to the front end wall 43. The first connection assembly 105 includes a bracket 106 coupled to the front end wall 43 that supports the shaft 67 of the auger section 70 thereon. The bracket 160 includes a rod 107 extending into the sub-chamber 34, and the rod 107 has a plurality of drive components (e.g., splines, axially extending keys or keyways) along the perimeter surface thereof. Note that the first connection assembly 105 holds the auger section 70 in a position such that the spiral blades 66 does not contact the inner surface of the trough 40.

The shaft 67 of the auger section 70 is a hollow shaft with a drive insert 71 fixedly located at each end. The drive inserts 71 have a plurality of drive components (e.g., splines, axially extending keys or keyways) that correspond and/or mate with the drive components on the rod 107. As such, when the shaft 67 is rotated, the rod 107 rotates with the shaft 67. In certain examples, the first connection assembly 105 includes a bearing (not depicted) that permits the rod 107 to rotate relative to the bracket 106. In other examples, the ends of the shaft 67 have smooth surfaces. In these examples, the end of the shaft 67 is inserted into or located around the rod 107 and one or more fasteners (e.g., screws, bolts; not depicted) axially fix the shaft 67 relative to the rod 107. In certain examples, a drive adapter (not depicted) is coupled to a motor having a diameter smaller than will engage with the drive insert 71. The drive adapter is configured to couple to the drive shaft of the motor and has drive components (e.g., splines, axially extending keys or keyways) that engage with the drive insert 71. As such, the auger sections 70 with drive inserts 71 can be utilized as a 'standard component' and the drive adapter can be utilized as needed.

In certain examples, the auger section 70 depicted in FIG. 12 is driven by a motor (not depicted) that is located at the front end wall 43. The motor rotates the end of the shaft 67 and the spiral blade 66 conveys the commodity toward the rear end 12 (FIG. 12) of the trailer 10. In these examples, one or more auger sections 70 are rotated by the motor that is located at the front end wall 43 and/or a different motor rotates other auger sections 70 located near the rear end wall 44.

However, in other examples, such as the example trailer 10 depicted in FIGS. 1-3, a motor is not required at the front end wall 43 to rotate the auger sections 70, and instead a single motor located near the rear end wall 44, such as motor 88 (FIG. 5), is configured to rotate all the auger sections 70. In these examples, the motor located at the front end wall 43 and all necessary pneumatic, hydraulic, and/or electrical components necessary are eliminated.

Figure 13:
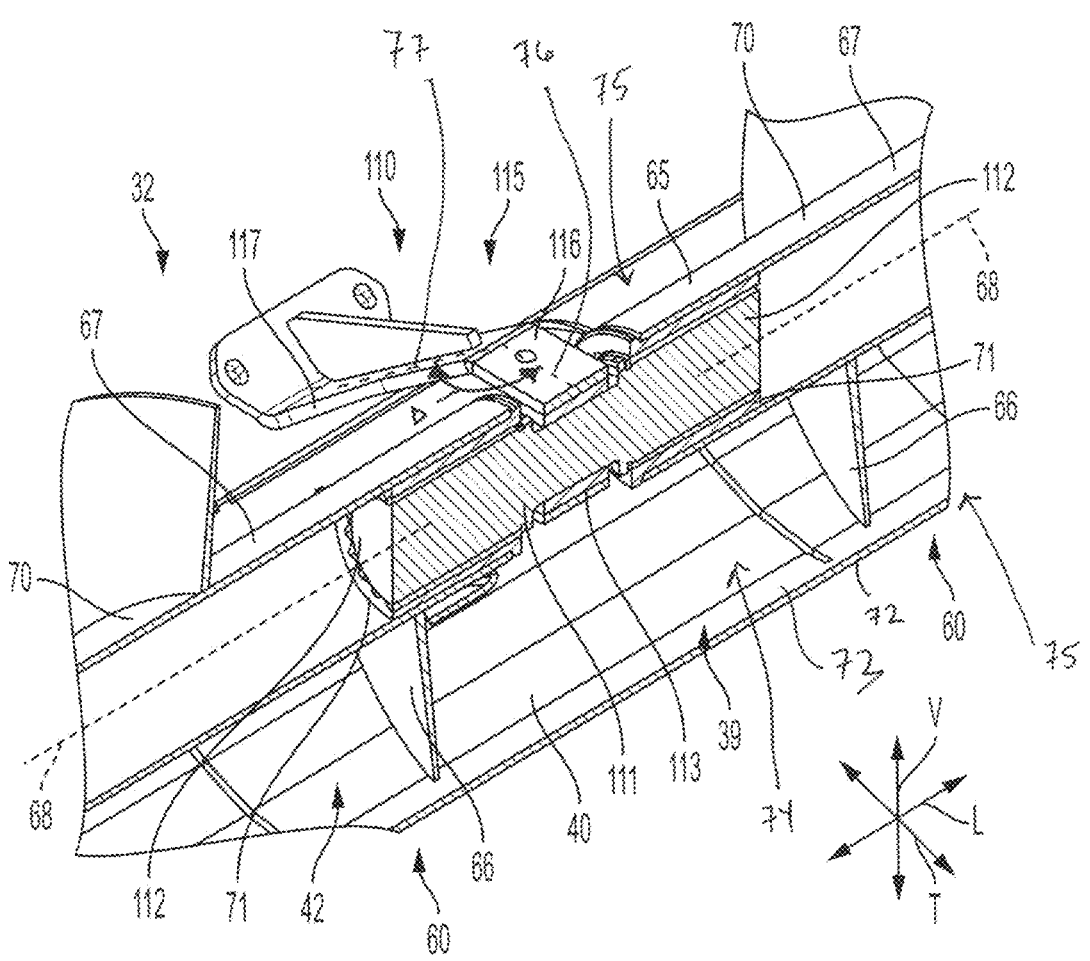
FIG. 13 is an enlarged cross-sectional view of the example trailer of FIG. 1 within line 13-13 on FIG. 11.

FIG. 13 depicts an example second connection assembly 110 that is utilized to couple two adjacent auger sections 70 having axes 68 that are generally aligned and parallel to each other. The second connection assembly 110 includes a rod 111 with opposing rod ends 112. Each rod end 112 has a plurality of drive components (e.g., splines, axially extending keys or keyways) along the perimeter surface thereof. The rod 111 passes through a bearing 113 which is coupled to a hanger 115 (described below), and the rod 111 is axially fixed while being axially rotatable.

The hollow shafts 67 of the auger sections 70 have drive inserts 71 fixedly located at each end. The drive inserts 71 have a plurality of drive components (e.g., splines, axially extending keys or keyways) that correspond to and/or mate with the drive components on the rod 111. As such, the shafts 67 and the rod 107 rotate together.

Figure 14:
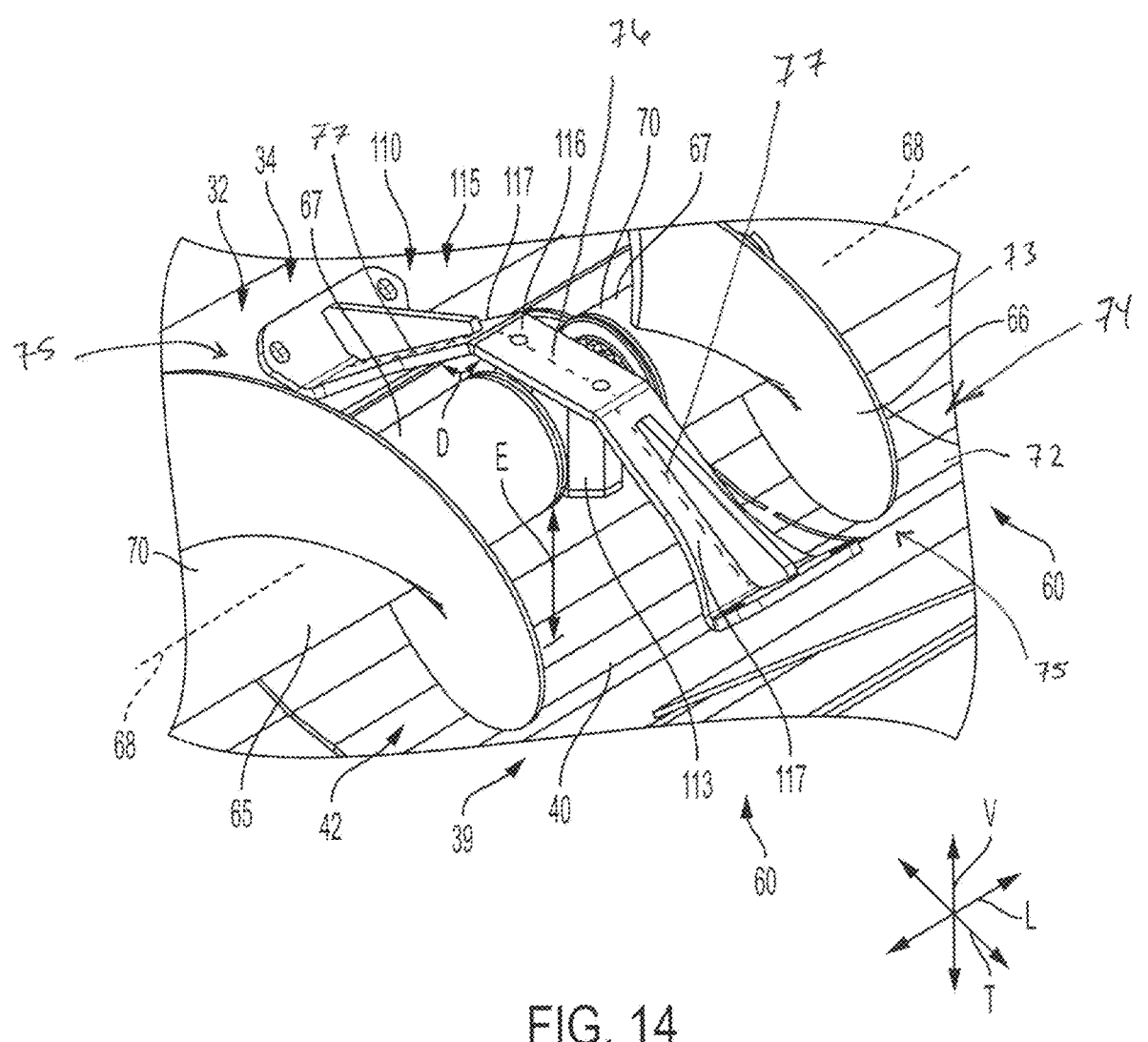
FIG. 14 is an enlarged perspective view of the example trailer of FIG. 1 within line 13-13 on FIG. 11.

An example hanger 115 for locating the auger sections 70 relative to the trough 40 is depicted in FIG. 14. The hanger 115 advantageously does not block or minimizes blockage of the flow of the commodity through the channel 42 as the auger sections 70 are rotated. In contrast, conventional trailers often include vertically extending pedestals that support the floor auger from the bottom of the trough. These vertically extending pedestals are an obstruction to the flow of the commodity through the channel 24 and thereby disadvantageously obstruct the flow of the commodity. The hangers 115 of the present disclosure also advantageously requires only one access door in the trough 40 for accessing, repairing, and/or maintaining the hanger 115 (in comparison to conventional trailers which often require two access doors in the trough at each pedestal location). The hangers 115 of the present disclosures also advantageously increase the accuracy of installing the floor auger 65 at the proper position.

The hanger 115 includes a body 116 that is coupled to the bearing 113 which is a located vertically below the body 116. The hanger 115 also includes a pair of laterally extending hanger arms 117 (namely a first hanger arm and a second hanger arm) that extend in opposite directions from the body 116. The hanger arms 117 generally laterally and/or vertically downwardly extend from the body 116. The body 116 extends along a body axis 76 and each hanger arm 117 extends along an arm axis 77. As such, an arm angle D is defined between the body axis 76 and each arm axis 77. In certain examples, the second axis extends transverse to the first axis. In certain examples, the arm angle D is an obtuse angle. In certain examples, the arm angle D is 110.0 degrees. Note that the present inventors recognized that vertically downwardly angling the arms 117 from the body 116 advantageously helps to vertically support the hanger 115 and the floor auger 65 on the trough wall 72 while not disadvantageously obstruct the flow of the commodity through the channel 42.

The arms 117 are fixedly coupled to the trough 40 with one or more fasteners (e.g., bolts, screws), and accordingly, the hanger 115 hangs the rod 111 and the auger sections 70 vertically above the trough 40 and the middle wall section 74. For example, the auger section 70 is vertically spaced above the lowermost portion of the trough 40 (see distance E on FIG. 14) such that the spiral blade 66 does not contact the trough 40.

Figure 15:
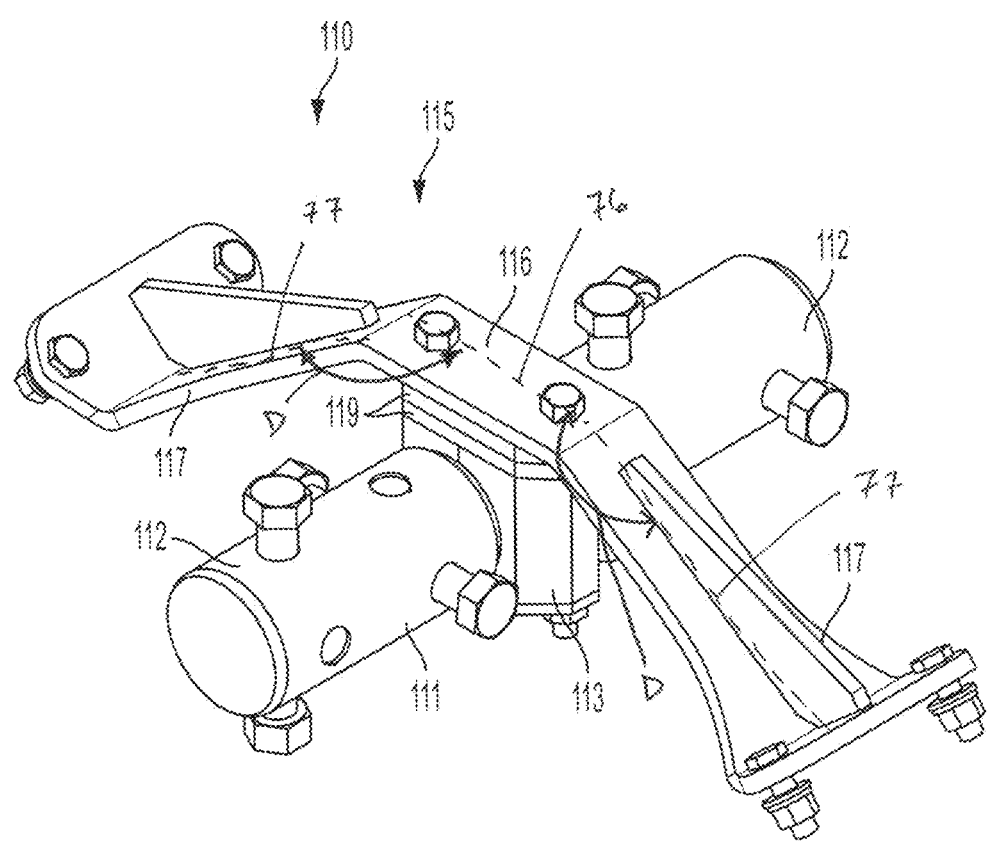
FIG. 15 is a perspective view of an example hanger according to the present disclosure.

FIG. 15 depicts another example hanger 115. The hanger 115 includes a plurality of spacers 119 which located between the body 116 and the bearing 113 are configured to adjust the vertical position of floor auger 65 in the channel the position of the rod 111 relative to the trough 40 (FIG. 14). For example, adding spacers 119 decreases the distance E (see FIG. 14) between the auger section 70 and the lowermost portion of the trough 40.

Figure 11:
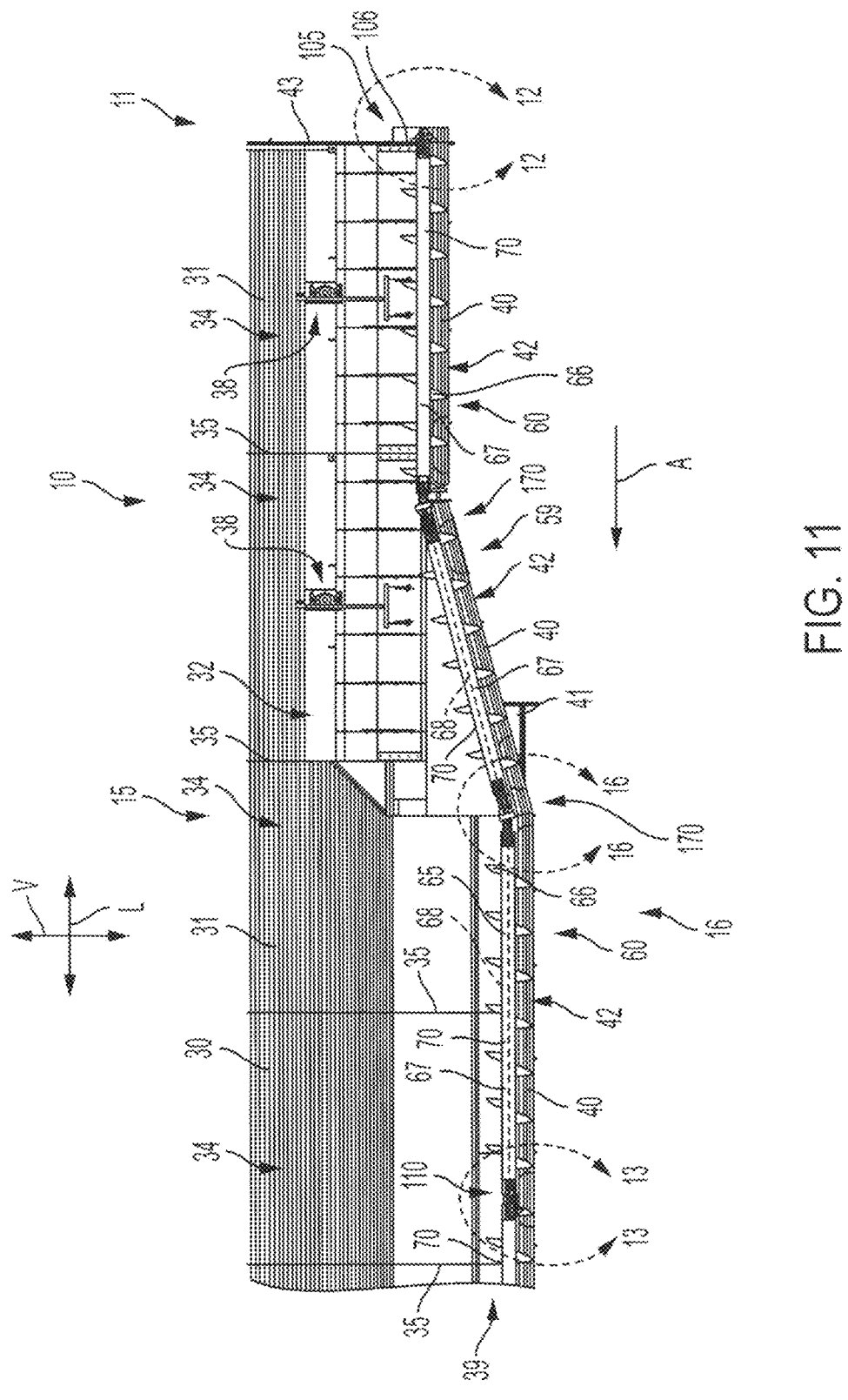
FIG. 11 is an enlarged cross-sectional view of the example trailer of FIG. 1 along line 11-11 on FIG. 3.
Figure 16:
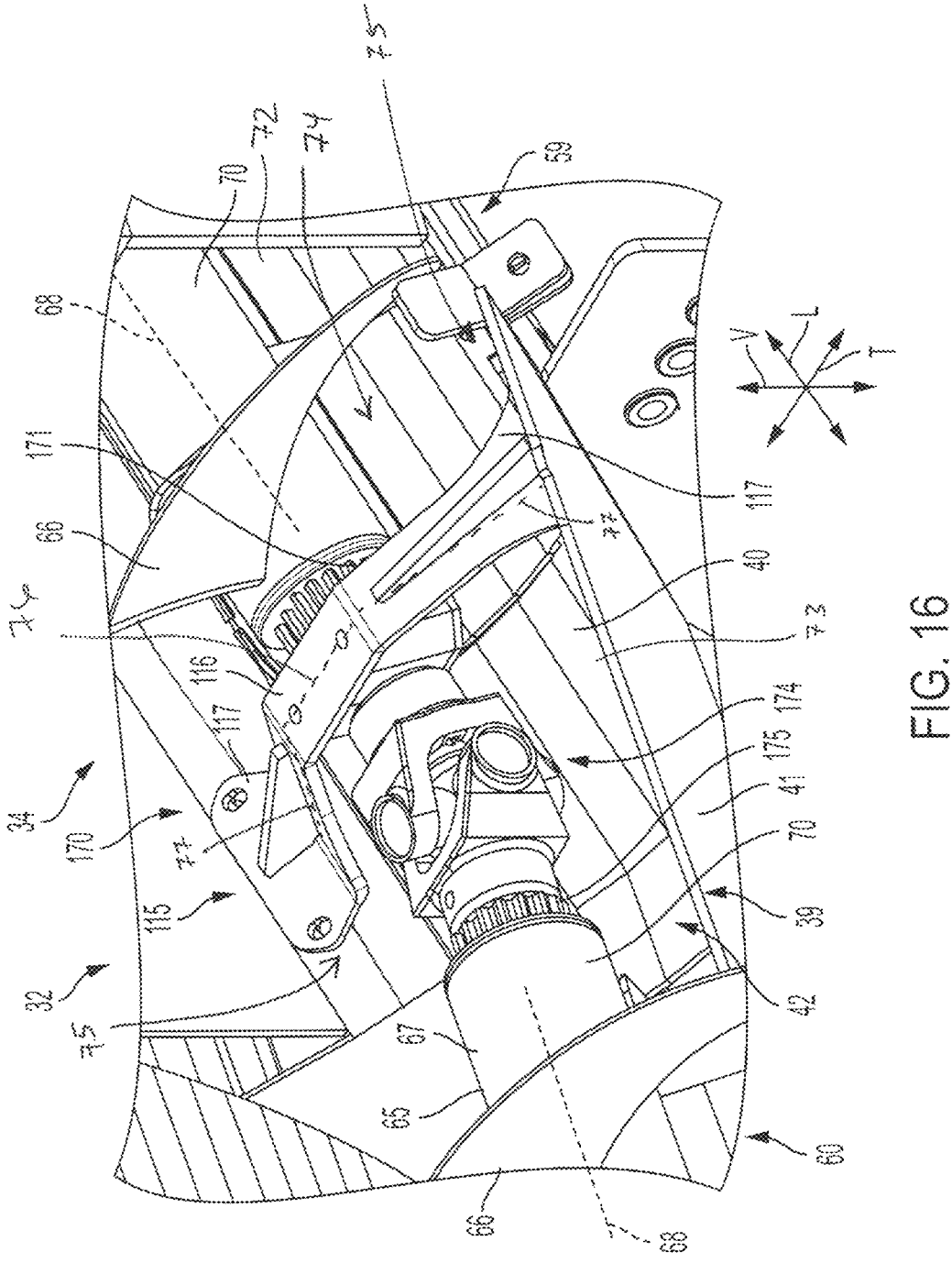
FIG. 16 is an enlarged perspective view of the example trailer of FIG. 1 within line 16-16 on FIG. 11.
Figure 17:
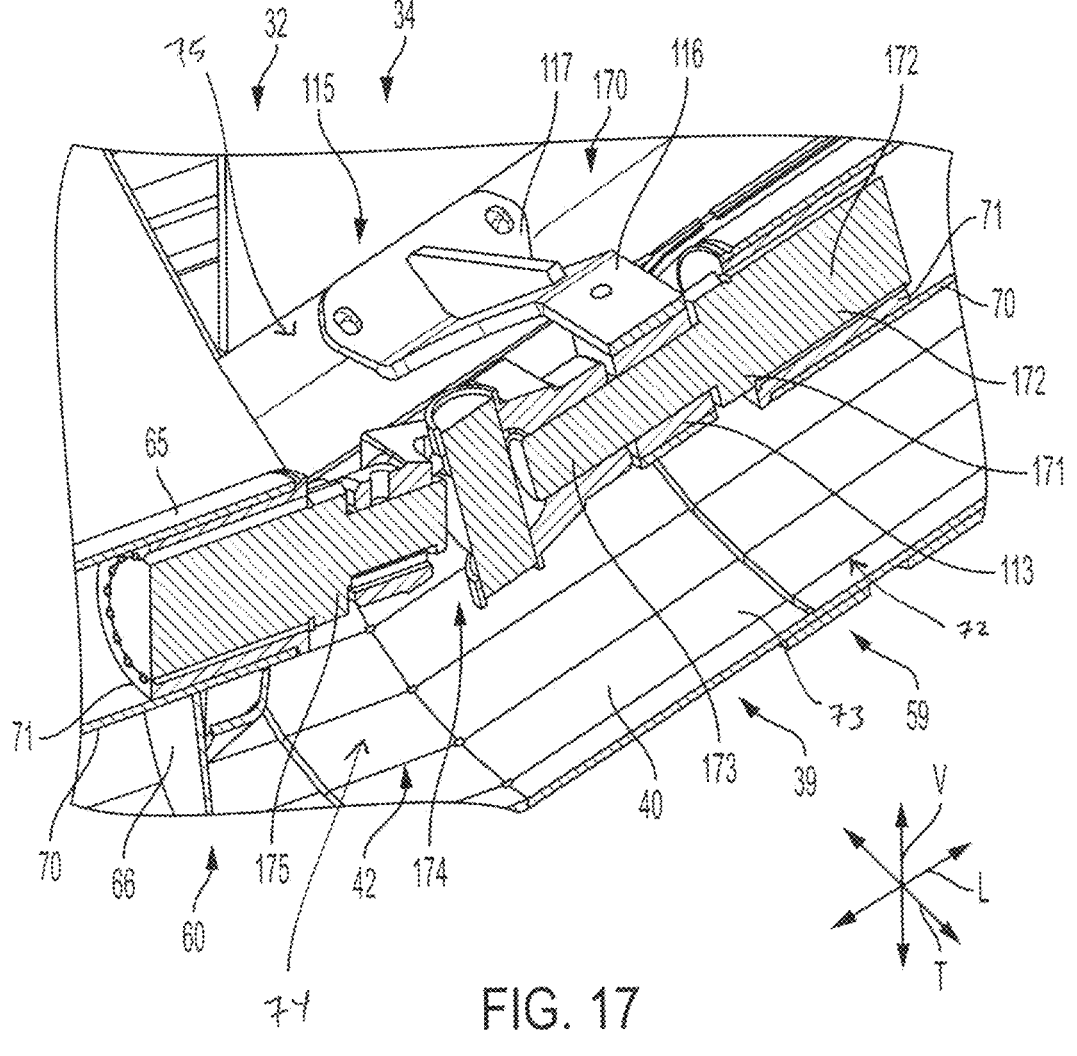
FIG. 17 is an enlarged cross-sectional view of the example trailer of FIG. 1 within line 16-16 on FIG. 11.

FIGS. 16-17 depict an example third connection assembly 170 that is utilized to couple two adjacent auger sections 70 having axes 68 that are misaligned to each other and/or that extend transverse to each other. This situation occurs when the trough 40 transitions between a longitudinally extending first trough section 60 (e.g., the longitudinally extending first trough section 60 and vertically sloped second trough section 59 and the auger sections 70 follow the shape of the trough 40. FIG. 11 depicts an example second trough section 59 of the trough 40 (which is supported by the sills 41 and/or other components of the frame 20 between two longitudinally extending first trough sections 60.

The third connection assembly 170 includes a rod 171 with opposing rod ends 172, 173. The first rod end 172 includes a plurality of drive components (e.g., splines, axially extending keys or keyways) along the perimeter surface thereof. The hollow shaft 67 of one of the auger sections 70 has a drive insert 71 with a plurality of drive components (e.g., splines, axially extending keys or keyways) that correspond to and/or mate with the drive components on the first rod end 172.

The second rod end 173 is coupled to a universal joint 174 configured to transmit torque between the shafts 67 of the adjacent auger sections 70. An adapter 175 is coupled to the universal joint 174, and the adapter 175 has a plurality of drive components (e.g., splines, axially extending keys or keyways) along the perimeter surface thereof. These drive components engage with corresponding drive components of the drive insert 71 coupled to the shaft 67 of the adjacent auger section 70. Referring now to FIGS. 1 and 10, the riser assembly 136 is depicted in greater detail. The riser assembly 136 includes a riser tube 129 in which the riser auger 128 extends. The riser tube 129 is generally a hollow cylindrical tube with a pair of opposing closed ends 133 which are closed by plates. Bearings 134 at the closed ends 133 rotatably support the ends of the riser auger 128.

Figure 21:
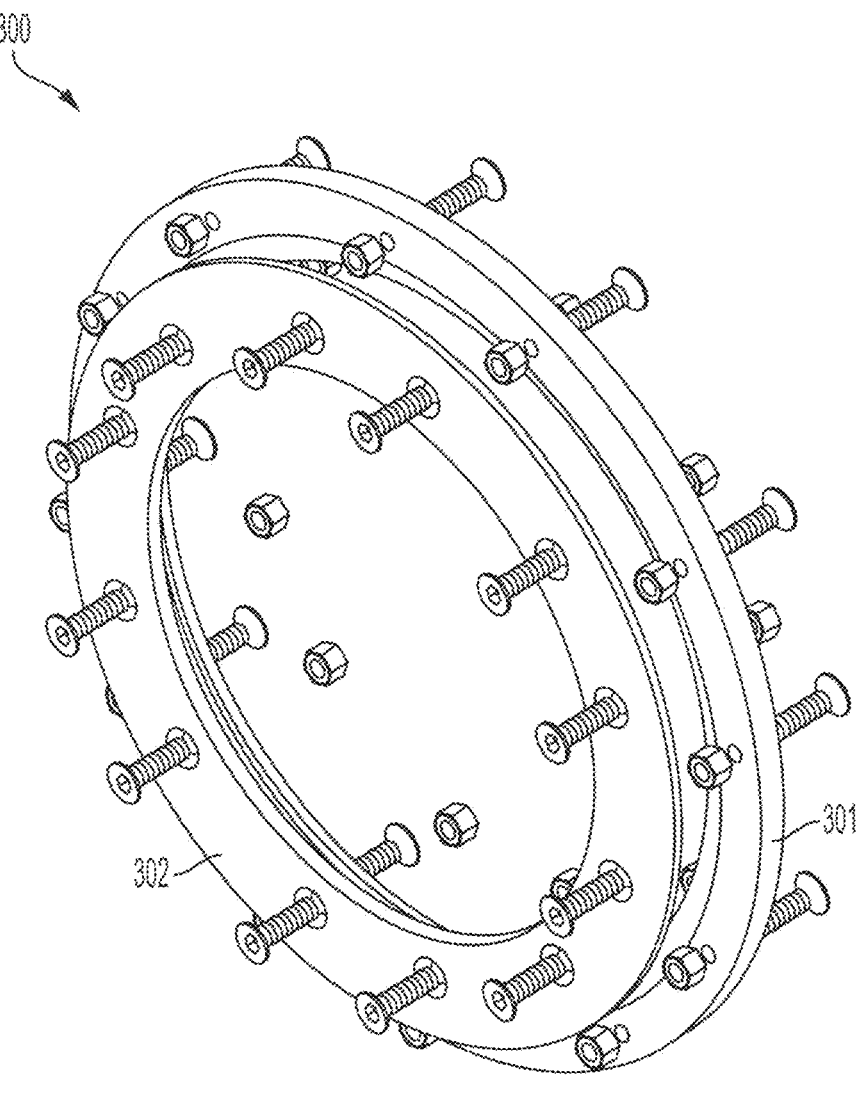
FIG. 21 is an exploded view of an example nesting ring assembly according to the present disclosure.

The upper end of the riser tube 129 has a swivel bracket assembly 137 coupled thereto, and the swivel bracket assembly 137 is configured to receive the commodity and direct the commodity to the boom arm 122. The swivel bracket assembly 137 also facilitates movement of the boom arm 122 relative to the riser tube 129. The swivel bracket assembly 137 can include any number of components such as flanges, plates, bearings, slide rings, and/or nesting ring assemblies 300. FIG. 21 depicts an example nesting ring assembly 300 according to the prevent disclosure. The nesting ring assembly 300 includes a first ring 301 that is rotatably fixed and a second ring 302 that is fixed to the boom arm 122. The ring 301, 302 engage each other such that the rings 301, 302 do not separate from each other, however, the second ring 302 rotates relative to the first ring 301 as the boom arm 122 moves. Note that a collar 167 secures the riser tube 129 to the rear end wall 44.

The present inventors recognized that conventional boom arms are often constructed a long tube (e.g., the conventional tube is 40-50 feet long, the conventional tube is a unitary component) and thus have several disadvantages including manufacturing tolerances related to long single tubes, costs associated with shipping the single tube (e.g., special transport permits or trailers), and/or costs associated with replacing the entire single tube when a portion of the tube is damaged. Through research and experimentation, the present inventors developed the improved boom arms 122 of the present disclosure that incorporate features and/or components that reduce or eliminate some of the disadvantages associated with conventional boom arms.

The boom arm 122 has a closed first boom end 123 coupled to the swivel bracket assembly 137. The boom arm 122 of the present disclosure has a plurality of boom sections 127. Each boom section 127 is generally a hollow cylindrical tube, and the boom sections 127 are coupled to each other via one or more boom connection assemblies 150 (described further herein; sec FIGS. 18-20). The length of each boom section 127 can vary, and preferably the length of each boom section 127 is less than the length of a conventional single-tube boom arms. In non-limiting examples, each boom section 127 has a length in the range of 10.0-30.0 feet.

The boom arm 122 is moveable into different positions relative to the tank 30 via one or more motors or actuators (not included). The boom arm 122 can move about the first boom end 123 in any number or direction such as the example directions (see arrow C) noted on FIGS. 1 and 10. One or more pneumatic, hydraulic, and/or electrical systems operate the augers 128, 140 and/or move the boom arm 122.

Note that the boom arm 122 and/or the riser assembly 136 advantageously occupy the space at the rear end 12 defined by the rear end wall 44 and the sills 41, which as noted above extend rearwardly of the rear end wall 44. By positioning the boom arm 122 and/or the riser assembly 136 in the space above the extended sills 41, the systems and/or components of the boom arm 122 and/or the riser assembly 136 are accessible to the operator and vertically supported by the sills 41 and/or the subframe 49. In certain examples, the weight of the pot 80 and/or the boom arm 122 is better distributed to the frame 20 and/or the wheels 17 of the trailer 10 due to the novel construction of the trailer 10 of the present disclosure. In contrast, conventional trailers often require additional components, cantilevered mounts, and/or framing when mounting conventional riser assemblies and/or boom arms to the trailer.

A boom auger 140 extends in the boom arm 122 and is configured to convey the commodity along the boom arm 122 and dispense the commodity via an open second boom end 125. A motor (not depicted) rotates the boom auger 140 to convey the commodity. The boom auger 140 has one or more boom auger sections 145 coupled to each other via the boom connection assemblies 150. Each boom auger section 145 includes a shaft 142 that extends along an axis 143 and one or more spiral blades 141 (FIG. 18) radially extend from the shaft 142. The spiral blades 66 convey the commodity through the boom arm 122, and a discharge hood 126 at the second boom end 125 directs the commodity into a container or receptacle (not depicted).

Figure 18:
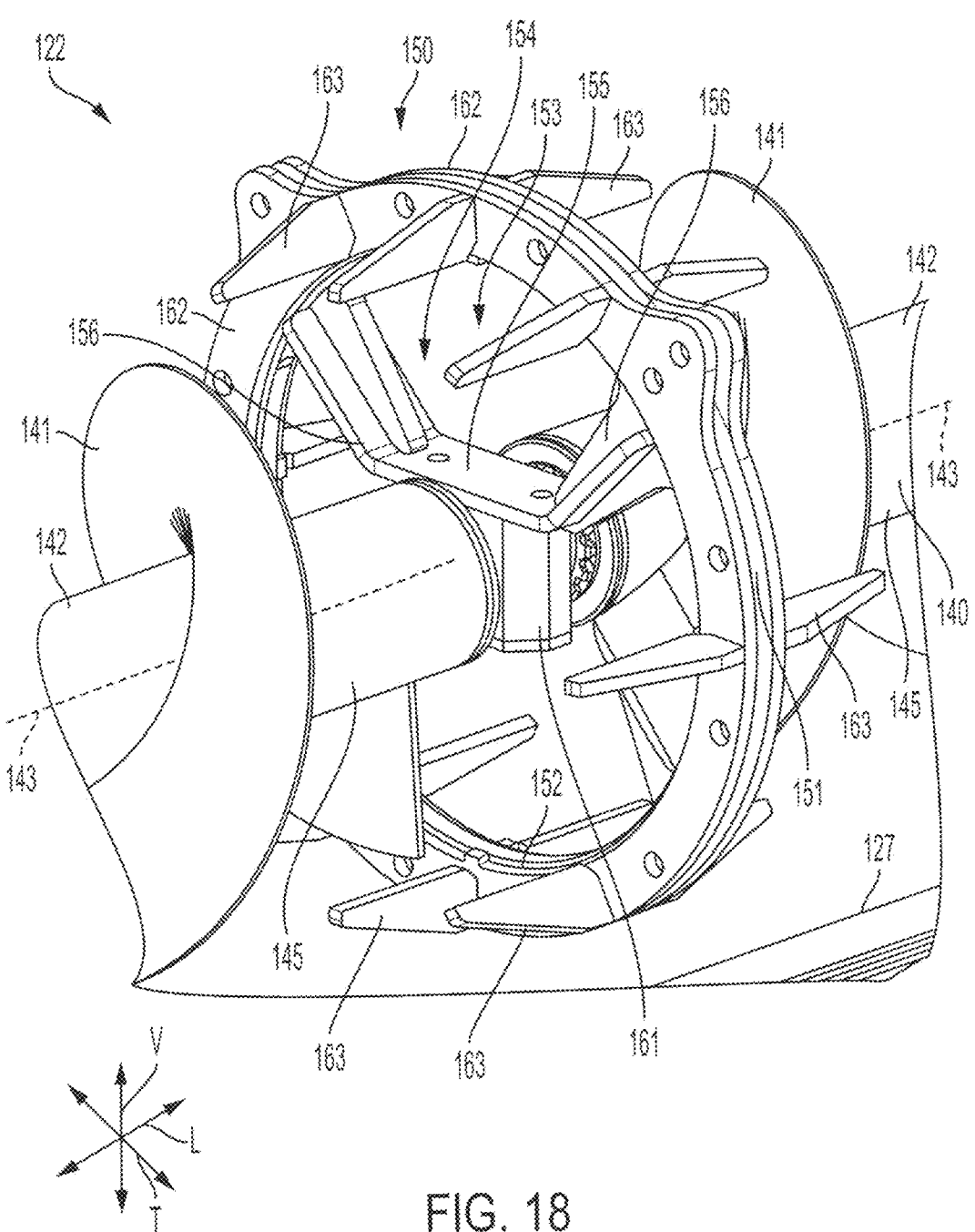
FIG. 18 is an enlarged perspective view of the example trailer of FIG. 1 within line 18-18 on FIG. 1 with boom sections removed.
Figure 19:
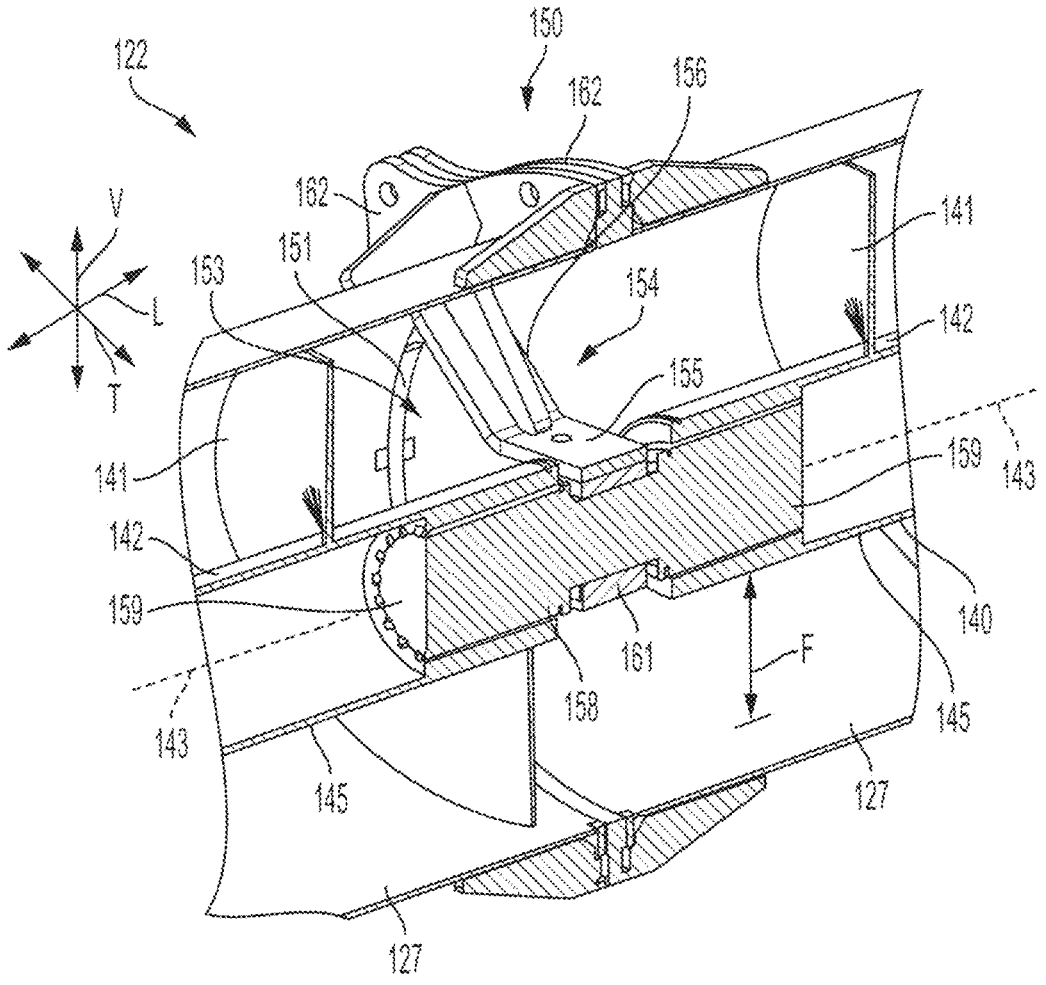
FIG. 19 is a cross-sectional view of the example trailer depicted in FIG. 18.
Figure 20:
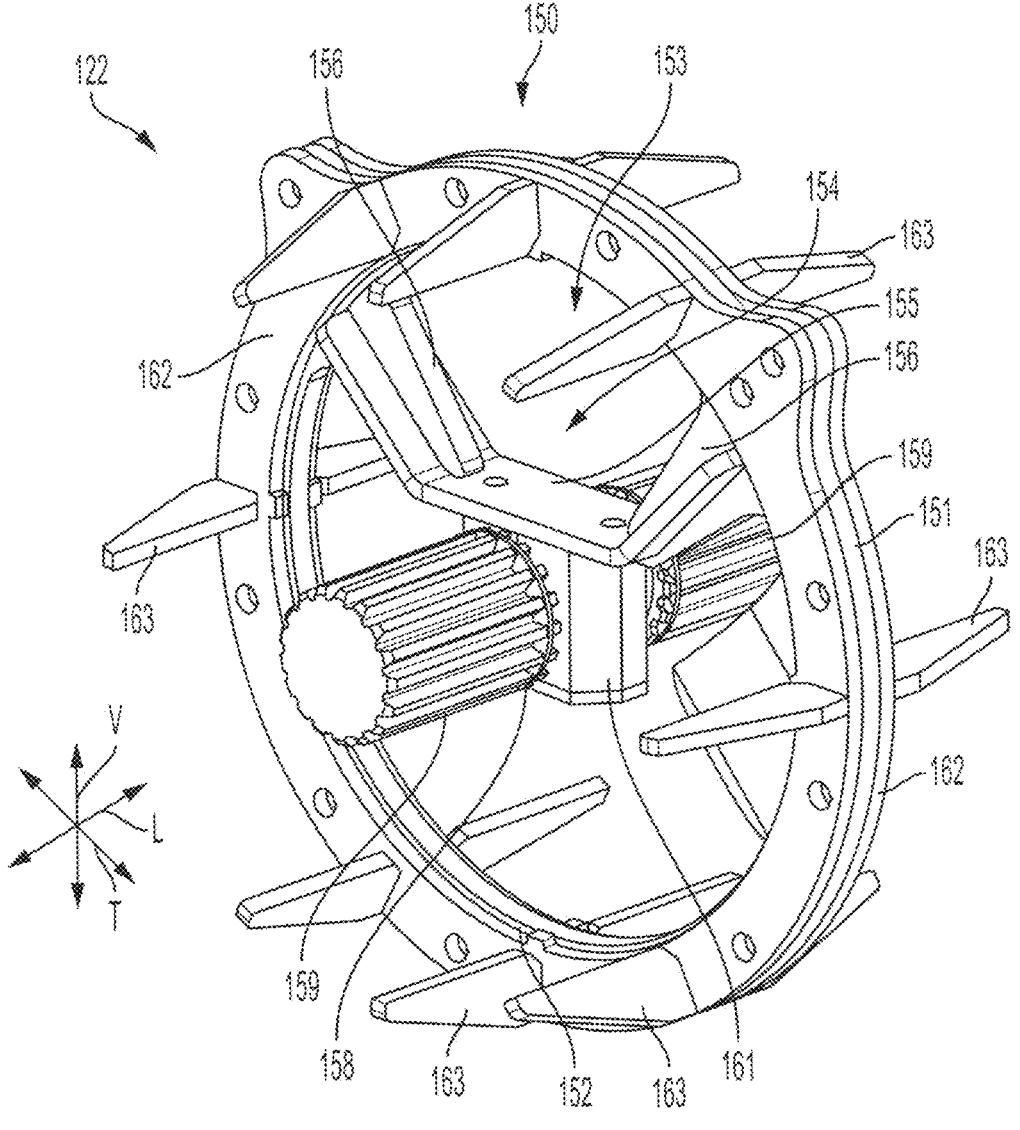
FIG. 20 is a perspective of an example boom connection assembly and outer rings of the present disclosure.

FIGS. 18-20 depict an example boom connection assembly 150 in greater detail. The boom connection assembly 150 includes a center ring 151 with opposing, axially facing side surfaces 152. The center ring 151 defines a passageway 153, and a boom hanger 154 extends from the center ring 151 into the passageway 153. The boom hanger 154 includes a body 155 and a plurality of radially extending arms 156. The arms 156 are fixedly coupled to the center ring 151. A rod 158 is coupled to the boom hanger 154 via a bearing 161. The rod 158 has opposing rod ends 159, and each rod end 159 has a plurality of drive components (e.g., splines, axially extending keys or keyways) along the perimeter surface thereof. The rod 158 axially rotates relative to the bearing 161.

Drive inserts 146 located at the ends of the boom auger sections 145 have a plurality of drive components (e.g., splines, axially extending keys or keyways) that correspond to and/or mate with the drive components on the rod ends 159. As such, as the shafts 142 of the boom auger sections 145 are rotated by a motor (not depicted), the rod 158 rotates with the shaft 142. Note that the auger sections 70 are supported by the boom connection assembly 150 relative to the boom sections 127 such that the spiral blades 141 do not contact the inner surface of the boom sections 127 (see distance F on FIG. 19 which depicts the distance between the shaft 142 and the inner surface of the boom sections 127).

Like the hangers 115 for the floor auger 65 (FIG. 14), the boom hanger 154 advantageously does not block the flow of the commodity through the boom arm 122. In contrast, conventional trailers often have pedestals that support the boom auger in the boom arm. In these conventional examples, the pedestals obstruct the flow of the commodity. In certain examples, one or more spacers (not depicted) are provided between the body 155 of the boom hanger 154 and the bearing 161 to adjust the position of the rod 158 relative to the inner surface of the boom section 127. For example, a spacer is included to decrease the distance E (see FIG. 7) between the inner surface of the boom section 127 and the shaft 142.

The ends of the boom sections 127 have coupler rings 162 attached thereto, and the coupler rings 162 are configured to couple to the center ring 151. One or more fasteners (e.g., screws, bolts and nuts) secure the coupler rings 162 to the center ring 151. The coupler rings 162 include a plurality of axially extending fins 163 that support the boom section 127 and present buckling. When the boom sections 127 and the coupler rings 162 are properly coupled to the center ring 151, the edges of the boom sections 127 engage the side surfaces 152 (FIG. 18) of the center ring 151 (see FIG. 19). Note that in certain examples, conventional bearing mounts are utilized to couple a boom section 127 to the swivel bracket assembly 137 and/or a boom section 127 to the hood 126.

Figure 22:
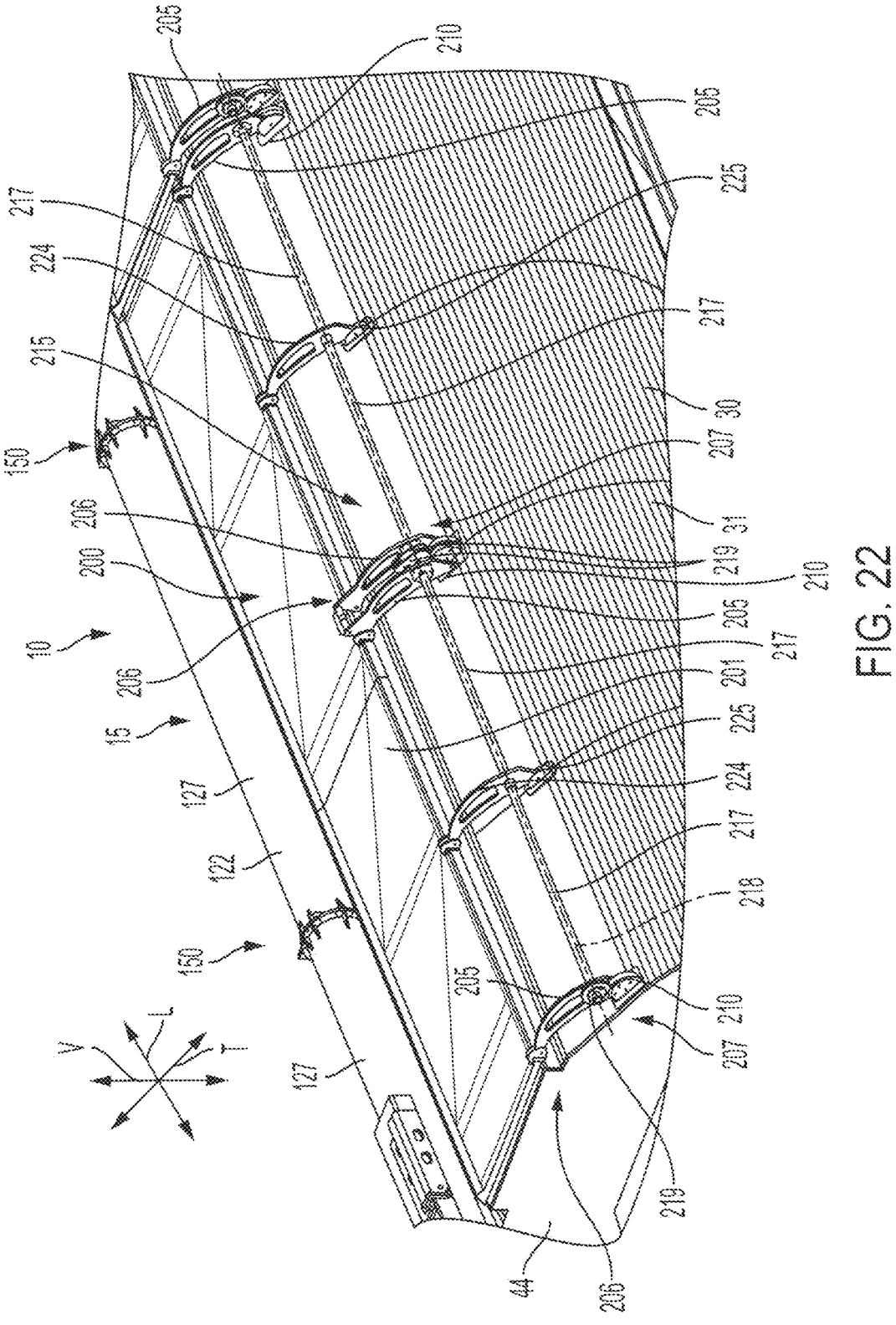
FIG. 22 is a perspective view of an example door assembly according to the present disclosure within line 22-22 in FIG. 2.
Figure 23:
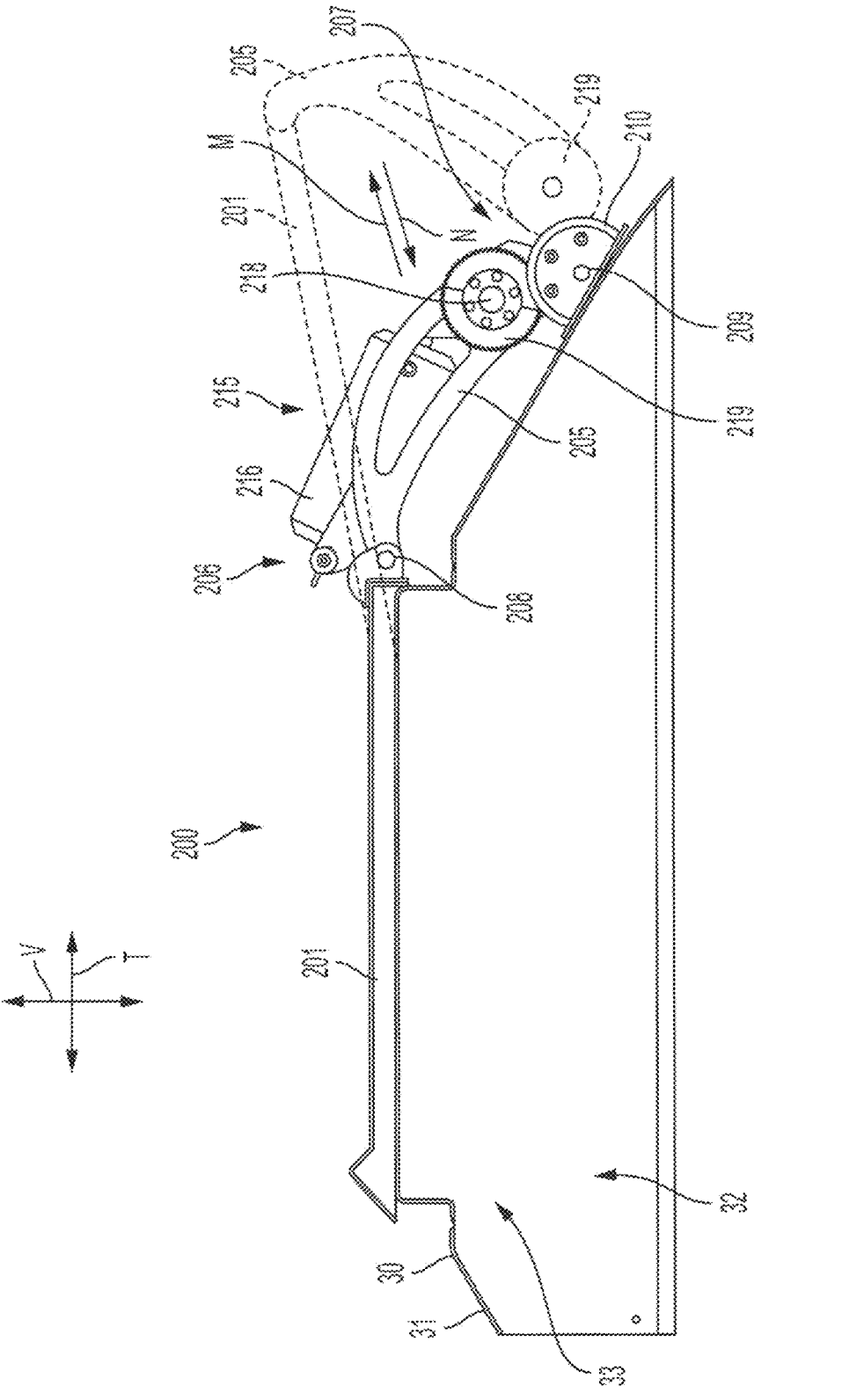
FIG. 23 is a side view of the example door assembly of FIG. 22 with a door depicted in a closed position.

FIGS. 22-23 depict an example door assembly 200 according to the present disclosure. The trailer 10 includes one or more door assemblies 200 which are operable to open or close one or more fill openings 33 at the trailer top 15 (FIG. 1) which are in communication with the chamber 32 of the tank 30. The door assembly 200 includes a door 201, and the FIGS. 22-23 depict the door 201 in a first door position in which the door 201 covers the fill opening 33. The door 201 rests on the sidewall 31 or other framing components such as bulkheads, rails, and/or beams that frame the fill openings 33. The door 201 is pivotally coupled to the sidewall 31 via a plurality of door arms 205.

Each door arm 205 has a first end 206 pivotably coupled to the door 201 at a first axis 208. A second end 207 is pivotally coupled to a bracket 210 at a second axis 209. The bracket 210 is fixed to the sidewall 31, and the bracket 210 includes a plurality of teeth (not depicted; e.g., tooth rack, fixed partial gear).

The door arms 205 and the brackets 210 are longitudinally spaced apart along the sidewall 31, and in the example depicted in FIG. 22, four sets of door arms 205 and brackets 210 that couple the example door 201 to the sidewall 31. Note that the two sets of secondary arms 224 and secondary brackets 225 are provided to further couple the door 201 to the sidewall 31. These secondary arms 224 and secondary brackets 225 may exclude certain features of the doors arms 205 and the brackets 210 such as the teeth.

An actuator assembly 215 extends to the doors arms 205 and is configured to pivot the door arms 205 and the door 201 such that the door 201 is moved into and between the closed position and the open position (see dashed lines on FIG. 23). The actuator assembly 215 includes an actuator 211 (e.g., piston) that is configured to rotate a rod 217 that is elongated along an axis 218. The rod 217 is coupled to the doors arms 205 and the secondary arms 224. In addition, one or more toothed gears 219 are fixedly coupled to the rod 217.

In operation, the actuator 216 rotates the rod 217 in a first direction such which also causes the gears 219 to rotate. The teeth of the gears 219 mesh with the teeth the brackets 210, and the gears 219 move along the brackets 210. As such, the door arms 205 and the secondary arms 224 pivot with the rod 217 and the gears 219 in a first direction (see arrow M on FIG. 23) and the door 201 is moved into the open position (see dashed lines on FIG. 23). Note that as the door 201 is moved into the open position (see dashed lines on FIG. 23), the trailing end of the door 201 slides along the fill openings 33. To move the door 201 from the open position to the closed position, the actuator 216 rotates the rod 217 in a second direction such that the door arms 205 and the secondary arms 224 pivot in a second direction (see arrow N on FIG. 23). The actuator assembly 215 advantageously requires less actuators to move the door 201 than conventional systems. Accordingly, the actuator assembly 215 of the present disclosure is less costly that conventional systems and/or does not require multiple actuators to be precisely synced in order to properly move the door and avoid door misalignment.

In certain independent examples, a trailer is for transporting a commodity and longitudinally extends between a front end and a rear end. The trailer includes a tank defining a chamber that is configured to receive the commodity and a discharge hopper located vertically below the chamber. The discharge hopper is configured to receive the commodity from the chamber, and the discharge hopper includes a trough wall that at least partially defines a channel. The trough wall has a middle wall section and a side wall section on each lateral side of the middle wall section. Each side wall section is located vertically above the middle wall section. A floor auger extends in the channel and configured to convey the commodity in a direction from the front end to rear end, and a hanger suspends the floor auger in the channel. The hanger has a first hanger arm that couples to one of the side wall sections and a second hanger arm that couples to the other of the side wall sections.

Optionally the hanger includes a body located between the first hanger arm and the second hanger arm. The body laterally extends along a body axis and the first hanger arm extends along an arm axis that extends transverse to the body axis. Optionally an arm angle is defined between the arm axis and the body axis, and the arm angle is an obtuse angle. Optionally the arm angle is a first arm angle and the second hanger arm extends along another arm axis that extends transverse to the body axis. A second arm angle is defined between the arm axis and the body axis, the second arm angle being an obtuse angle. Optionally the first arm angle equals the second arm angle. Optionally a bearing is for rotatably coupling the floor auger relative to the channel and the bearing is coupled to the body and located vertically below the body. Optionally a removable spacer is located between the body and the bearing to thereby change vertical position of the floor auger relative to the trough. Optionally the hanger is one of a plurality of hangers that suspend the floor auger relative to the channel, and the plurality of hangers are longitudinally spaced apart along the floor auger. Optionally the trough has a vertically sloped second trough section located between two longitudinally extending first trough sections. Optionally the floor auger includes a first auger section that extends along one of the first trough sections, a second auger section that extends along the second trough section, a third auger section that extends along the other of the first trough sections, and a pair of connection assemblies utilized to couple the second auger section to the first auger section and the second auger section to the third auger section, each of the connection assemblies includes a universal joint. Optionally a pot is configured to receive the commodity from the channel, a riser auger is configured to convey the commodity from the pot, a boom arm is configured to receive the commodity from the riser auger, the boom arm having a plurality of boom sections, and a boom auger is in the boom arm and configured to convey the commodity along the boom arm to a discharge hood from which the commodity is dispensed. The boom auger includes a plurality of boom auger sections. A boom connection assembly is located between adjacent boom sections in the plurality of boom sections and adjacent boom auger sections in the boom auger sections. The boom connection assembly couples the adjacent boom sections and the boom auger sections together. Optionally the boom connection assembly includes a center ring that encircles the boom auger and to which the adjacent boom sections are coupled. Optionally each boom section includes a coupler ring coupled to the center ring. Optionally the boom connection assembly includes a boom hanger suspends the adjacent boom auger sections in the boom arm. Optionally the boom hanger includes a body between a pair of arms that radially extend and couple to the center ring and the adjacent boom auger sections are coupled to the body. Optionally the boom hanger includes a body between a pair of arms that radially extend and couple to the center ring and the adjacent boom auger sections are coupled to the body. Optionally a door is for closing an opening into the chamber of the tank, a first door arm is coupled between the door and the tank, a second door arm is coupled between the door and the tank, the second door arm is spaced apart from the first door arm, and a rod is coupled to and extending between the first door arm and the second door arm. An actuator rotates the rod in a first direction to thereby move the first door arm and the second door arm together in a first direction such that the door uncovers the opening and a second direction to thereby move the first door arm and the second door arm together in a second direction such that door covers the opening. Optionally a gear is coupled to the rod that meshes with a bracket having a plurality of teeth and the gear and the bracket are located adjacent to the second door arm. Option-
ally a pot configured is to receive the commodity from the
channel, a riser auger is configured to convey the commodity
from the pot, a boom arm is configured to receive the
commodity from the riser auger, the boom arm having a
plurality of boom sections, and a boom auger is in the boom
arm and configured to convey the commodity along the
boom arm to a discharge hood from which the commodity
is dispensed. The boom auger includes a plurality of boom
auger sections. A boom connection assembly is located
between adjacent boom sections in the plurality of boom
sections and adjacent boom auger sections in the boom
auger sections. The boom connection assembly couples the
adjacent boom sections and the boom auger sections
together. Optionally a center ring encircles the boom auger
and to which the adjacent boom sections are coupled and a
boom hanger suspends the adjacent boom auger sections in
the boom arm.

Citations to a number of references are made herein. The
cited references are incorporated by reference herein in their
entireties. In the event that there is an inconsistency between
a definition of a term in the specification as compared to a
definition of the term in a cited reference, the term should be
interpreted based on the definition in the specification.

In the present description, certain terms have been used
for brevity, clarity, and understanding. No unnecessary limi-
tations are to be inferred therefrom beyond the requirement
of the prior art because such terms are used for descriptive
purposes and are intended to be broadly construed. The
different apparatuses, systems, and method steps described
herein may be used alone or in combination with other
apparatuses, systems, and methods. It is to be expected that
various equivalents, alternatives, and modifications are pos-
sible within the scope of the appended claims.

This written description uses examples to disclose the
invention and also to enable any person skilled in the art to
make and use the invention. The patentable scope of the
invention is defined by the claims, and may include other
examples that occur to those skilled in the art. Such other
examples are intended to be within the scope of the claims
if they have structural elements that do not differ from the
literal language of the claims, or if they include equivalent
structural elements with insubstantial differences from the
literal languages of the claims.

What is claimed is:

1. A trailer for transporting a commodity, the trailer
comprising:
a front end and a rear end;
a tank defining a chamber configured to receive the
commodity;
a discharge hopper located below the chamber and con-
figured to receive the commodity from the chamber, the
discharge hopper defines a channel;
a floor auger extending in the channel and configured to
convey the commodity in a direction from the front end
to the rear end; and
a hanger with a pair of opposing hanger arms coupled to
the discharge hopper and a body coupled to the floor
auger such that the hanger suspends the floor auger in
the channel, the body is vertically above the hanger
arms, and the hanger arms do not obstruct the com-
modity being conveyed by the floor auger vertically
below the body.

2. The trailer according to claim 1, wherein the pair of
opposing hanger arms includes a first hanger arm and a
second hanger arm;
wherein the body laterally extends along a body axis; and wherein the first hanger arm extends along an arm axis
that extends transverse to the body axis.

3. The trailer according to claim 2, wherein an arm angle
is defined between the arm axis and the body axis, and
wherein the arm angle is an obtuse angle.

4. The trailer according to claim 3, wherein the arm angle
is a first arm angle;
wherein the second hanger arm extends along another arm
axis that extends transverse to the body axis; and
wherein a second arm angle is defined between the arm
axis and the body axis, the second arm angle being an
obtuse angle.

5. The trailer according to claim 4, wherein the first arm
angle equals the second arm angle.

6. A trailer for transporting a commodity, the trailer
longitudinally extends between a front end and a rear end,
the trailer comprising:
a tank defining a chamber that is configured to receive the
commodity;
a discharge hopper located vertically below the chamber
and configured to receive the commodity from the
chamber, the discharge hopper includes a trough wall
that at least partially defines a channel and the trough
wall has a middle wall section and a side wall section
on each lateral side of the middle wall section, wherein
each side wall section is located vertically above the
middle wall section;
a floor auger extending in the channel and configured to
convey the commodity in a direction from the front end
to the rear end; and
a hanger that suspends the floor auger in the channel, the
hanger includes:
a first hanger arm that couples to one of the side wall
sections;
a second hanger arm that couples to the other of the side
wall sections;
a body located between the first hanger arm and the
second hanger arm; and
a bearing for rotatably coupling the floor auger relative to
the channel, the bearing coupled to the body and
located vertically below the body.

7. The trailer according to claim 6, further comprising a
removable spacer located between the body and the bearing
to thereby change vertical position of the floor auger relative
to a trough of the discharge hopper.

8. The trailer according to claim 6, wherein the hanger is
one of a plurality of hangers that suspend the floor auger
relative to the channel, and wherein the plurality of hangers
are longitudinally spaced apart along the floor auger.

9. A trailer for transporting a commodity, the trailer
longitudinally extends between a front end and a rear end,
the trailer comprising:
a tank defining a chamber that is configured to receive the
commodity;
a discharge hopper located vertically below the chamber
and configured to receive the commodity from the
chamber, the discharge hopper includes a trough and a
trough wall, the trough wall that at least partially
defines a channel and the trough wall has a middle wall
section and a side wall section on each lateral side of
the middle wall section, wherein each side wall section
is located vertically above the middle wall section;
a floor auger extending in the channel and configured to
convey the commodity in a direction from the front end
to the rear end; and
a hanger that suspends the floor auger in the channel, the
hanger having a first hanger arm that couples to one of the side wall sections and a second hanger arm that couples to the other of the side wall sections; and wherein the trough has a vertically sloped second trough section located between two longitudinally extending first trough sections.

10. The trailer according to claim 9, wherein the floor auger includes:

a first auger section that extends along one of the first trough sections;

a second auger section that extends along the second trough section;

a third auger section that extends along the other of the first trough sections; and a pair of connection assemblies utilized to couple the second auger section to the first auger section and the second auger section to the third auger section, wherein each of the connection assemblies includes a universal joint.

11. The trailer according to claim 1, further comprising:

a pot configured to receive the commodity from the channel;

a riser auger configured to convey the commodity from the pot;

a boom arm configured to receive the commodity from the riser auger, the boom arm having a plurality of boom sections;

a boom auger in the boom arm and configured to convey the commodity along the boom arm to a discharge hood from which the commodity is dispensed, the boom auger includes a plurality of boom auger sections; and a boom connection assembly located between adjacent boom sections in the plurality of boom sections and adjacent boom auger sections in the boom auger sections, wherein the boom connection assembly couples the adjacent boom sections and the boom auger sections together.

12. A trailer for transporting a commodity, the trailer longitudinally extends between a front end and a rear end, the trailer comprising:

a tank defining a chamber that is configured to receive the commodity;

a discharge hopper located vertically below the chamber and configured to receive the commodity from the chamber, the discharge hopper includes a trough wall that at least partially defines a channel and the trough wall has a middle wall section and a side wall section on each lateral side of the middle wall section, wherein each side wall section is located vertically above the middle wall section;

a floor auger extending in the channel and configured to convey the commodity in a direction from the front end to the rear end;

a pot configured to receive the commodity from the channel;

a riser auger configured to convey the commodity from the pot;

a boom arm configured to receive the commodity from the riser auger, the boom arm having a plurality of boom sections;

a boom auger in the boom arm and configured to convey the commodity along the boom arm to a discharge hood from which the commodity is dispensed, the boom auger includes a plurality of boom auger sections; and a boom connection assembly located between adjacent boom sections in the plurality of boom sections and adjacent boom auger sections in the boom auger sections, wherein the boom connection assembly couples the adjacent boom sections and the boom auger sections together; wherein the boom connection assembly includes a center ring that encircles the boom auger and to which the adjacent boom sections are coupled.

13. The trailer according to claim 12, wherein each boom section includes a coupler ring coupled to the center ring.

14. The trailer according to claim 12, wherein the boom connection assembly includes a boom hanger suspends the adjacent boom auger sections in the boom arm.

15. The trailer according to claim 14, wherein the boom hanger includes a body between a pair of arms that radially extend and couple to the center ring, and wherein the adjacent boom auger sections are coupled to the body.

16. A trailer for transporting a commodity, the trailer longitudinally extends between a front end and a rear end, the trailer comprising:

a tank defining a chamber that is configured to receive the commodity;

a discharge hopper located vertically below the chamber and configured to receive the commodity from the chamber, the discharge hopper includes a trough wall that at least partially defines a channel and the trough wall has a middle wall section and a side wall section on each lateral side of the middle wall section, wherein each side wall section is located vertically above the middle wall section;

a floor auger extending in the channel and configured to convey the commodity in a direction from the front end to the rear end;

a hanger that suspends the floor auger in the channel, the hanger having a first hanger arm that couples to one of the side wall sections and a second hanger arm that couples to the other of the side wall sections;

a door that is for closing an opening into the chamber of the tank;

a first door arm coupled between the door and the tank;

a second door arm coupled between the door and the tank, the second door arm spaced apart from the first door arm;

a rod coupled to and extending between the first door arm and the second door arm; and an actuator that rotates the rod in a first direction to thereby move the first door arm and the second door arm together in a first direction such that the door uncovers the opening and a second direction to thereby move the first door arm and the second door arm together in a second direction such that the door covers the opening.

17. The trailer according to claim 16, further comprising a gear that is coupled to the rod that meshes with a bracket having a plurality of teeth; and wherein the gear and the bracket are located adjacent to the second door arm.

18. The trailer according to claim 16, further comprising:

a pot configured to receive the commodity from the channel;

a riser auger configured to convey the commodity from the pot;

a boom arm configured to receive the commodity from the riser auger, the boom arm having a plurality of boom sections;

a boom auger in the boom arm and configured to convey the commodity along the boom arm to a discharge hood from which the commodity is dispensed, the boom auger includes a plurality of boom auger sections; and a boom connection assembly located between adjacent boom sections in the plurality of boom sections and adjacent boom auger sections in the boom auger sections, wherein the boom connection assembly couples the adjacent boom sections and the boom auger sections together.

19. The trailer according to claim 18, wherein the boom connection assembly includes:

a center ring to which the adjacent boom sections are coupled and that encircles the boom auger; and a boom hanger suspends the adjacent boom auger sections in the boom arm.

20. A trailer for transporting a commodity, the trailer comprising:

a front end and a rear end;

a tank defining a chamber that is configured to receive the commodity;

a discharge hopper located below the chamber and configured to receive the commodity from the chamber, the discharge hopper defines a channel and includes a trough with a plurality of trough sections, wherein at least one trough section in the plurality of trough sections is sloped and extends transverse to another adjacent trough section in the plurality of trough sections; and a floor auger extending along the plurality of trough sections and in the channel and configured to convey the commodity in a direction from the front end to the rear end.

\* \* \* \* \*